United States Patent
Kilian et al.

(10) Patent No.: US 11,456,808 B2
(45) Date of Patent: Sep. 27, 2022

(54) DATA RECEIVER AND METHOD OF IDENTIFYING AN OPERATIONAL STATE OF A DATA TRANSMITTER BY MONITORING ENVIRONMENT PARAMETERS

(71) Applicant: DIEHL METERING GMBH, Ansbach (DE)

(72) Inventors: Gerd Kilian, Erlangen (DE); Josef Bernhard, Nabburg (DE); Thomas Kauppert, Nuremberg (DE); Hristo Petkov, Nuremberg (DE); Johannes Wechsler, Spalt (DE); Jakob Kneissl, Fuerth (DE); Raphael Mzyk, Kammerstein (DE); Dominik Soller, Schwaig (DE); Rafael Psiuk, Nuremberg (DE)

(73) Assignee: Diehl Metering GmbH, Ansbach (DE)

( * ) Notice: Subject to any disclaimer, the term of this patent is extended or adjusted under 35 U.S.C. 154(b) by 90 days.

(21) Appl. No.: 16/861,442

(22) Filed: Apr. 29, 2020

(65) Prior Publication Data
US 2020/0343980 A1 Oct. 29, 2020

(30) Foreign Application Priority Data
Apr. 29, 2019 (DE) .................. 102019206116.8

(51) Int. Cl.
*H04B 17/17* (2015.01)
*H04W 4/38* (2018.01)
*H04W 4/70* (2018.01)

(52) U.S. Cl.
CPC .............. *H04B 17/17* (2015.01); *H04W 4/38* (2018.02); *H04W 4/70* (2018.02)

(58) Field of Classification Search
CPC ......... H04B 17/10; H04B 17/17; H04W 4/38; H04W 4/70
See application file for complete search history.

(56) References Cited

U.S. PATENT DOCUMENTS

| | | | |
|---|---|---|---|
| 9,127,597 B2* | 9/2015 | Masiello ................... | F02C 9/28 |
| 2009/0119243 A1* | 5/2009 | Yuan ....................... | G06N 7/005 |
| | | | 706/52 |
| 2012/0310559 A1* | 12/2012 | Taft ..................... | H02J 13/00034 |
| | | | 702/62 |

(Continued)

OTHER PUBLICATIONS

Verordnung EU 2016/679 Des Europaeischen Parlaments und des Rates von Apr. 27, 2016, pp. 1/88.

*Primary Examiner* — Redentor Pasia
(74) *Attorney, Agent, or Firm* — Laurence A. Greenberg; Werner H. Stemer; Ralph E. Locher

(57) ABSTRACT

A data receiver receives at least one signal from a data transmitter and determines therefrom at least one environment parameter of the data transmitter or of an environment of the data transmitter. The data receiver is configured to identify an operational state of the data transmitter or of a component of the data transmitter by comparing the at least one environment parameter so received or an environment parameter profile determined on the basis of the at least one environment parameter, with an environment parameter reference profile which describes an expected environment parameter or an expected environment parameter profile in the environment of the data transmitter.

26 Claims, 12 Drawing Sheets

(56) References Cited

U.S. PATENT DOCUMENTS

| | | | |
|---|---|---|---|
| 2013/0035884 A1* | 2/2013 | Burke | H02J 13/00002 |
| | | | 702/61 |
| 2015/0031326 A1* | 1/2015 | Begin | H04W 24/08 |
| | | | 455/405 |
| 2016/0283343 A1* | 9/2016 | Cattoen | G06F 11/3065 |
| 2016/0283443 A1* | 9/2016 | Michalscheck | F16K 35/00 |
| 2019/0334769 A1* | 10/2019 | Stamatakis | H04L 41/0813 |
| 2020/0051419 A1* | 2/2020 | Malaver | G06F 3/0484 |
| 2020/0143648 A1* | 5/2020 | Trani | G08B 25/14 |
| 2020/0226691 A1* | 7/2020 | Vavrasek | G06N 20/00 |
| 2020/0336980 A1* | 10/2020 | Fuleshwar Prasad | |
| | | | H04W 52/0206 |
| 2021/0217097 A1* | 7/2021 | Trainor | G06N 20/00 |

* cited by examiner

DATA RECEIVER AND METHOD OF IDENTIFYING AN OPERATIONAL STATE OF A DATA TRANSMITTER BY MONITORING ENVIRONMENT PARAMETERS

CROSS-REFERENCE TO RELATED APPLICATION

This application claims the priority, under 35 U.S.C. § 119, of German patent application DE 10 2019 206 116, filed Apr. 29, 2019; the prior application is herewith incorporated by reference in its entirety.

BACKGROUND OF THE INVENTION

Field of the Invention

The present invention relate to a data receiver of a communication system and specifically to a data receiver which identifies an operational state or a deviation from a reference operational state of a data transmitter by monitoring environment parameters of the data transmitter or of an environment of the data transmitter. Some exemplary embodiments relate to an identification of faults in an installation or in operation through monitoring of ambient parameters.

Sensor nodes which have a sensor for the environment parameter which is to be defined are conventionally used to define environment parameters such as e.g. temperature, pressure, relative humidity, etc. The sensor value which is defined with the sensor and which describes the environment parameter in the environment of the sensor node is transmitted at certain time intervals (e.g. regularly or periodically) or on request, by means of a signal which has the sensor value and possibly further payload data, to a data receiver such as e.g. a base station in the case of a sensor system with a large number of sensor nodes.

For reasons of cost, however, the sensors used in the sensor nodes are usually very imprecise. It is furthermore necessary to provide additional sensor nodes if the existing sensor nodes have no sensor for the required environmental parameter.

BRIEF SUMMARY OF THE INVENTION

It is accordingly an object of the invention to provide a device and a method, which overcome the above-mentioned and other disadvantages of the heretofore-known devices and methods of this general type and which, in simple terms, provide for an improvement of the existing situation.

With the above and other objects in view there is provided, in accordance with the invention, a data receiver that is configured:
to receive at least one signal from a data transmitter and to obtain at least one environment parameter of the data transmitter or of an ambient environment of the data transmitter; and
to identify an operational state of the data transmitter or of a component of the data transmitter on a basis of a comparison between:
the at least one environment parameter or an environment parameter profile determined on a basis of the at least one environment parameter received from the data transmitter; and
an environment parameter reference profile which describes an expected environment parameter or an expected environment parameter profile in the ambient environment of the data transmitter.

In other words, the invention provides for a data receiver, wherein the data receiver is configured to receive at least one signal [e.g. one signal or a plurality of signals] from a data transmitter, to obtain [e.g. to receive and/or to determine] at least one environment parameter [e.g. one environment parameter or a plurality of environment parameters; e.g. one temperature or a plurality of temperatures] of the data transmitter or of an environment of the data transmitter, wherein the data receiver is configured to identify [e.g. to determine] an operational state [e.g. a fault-free or a defective operational state] of the data transmitter or of a component [e.g. a battery] of the data transmitter on the basis of a comparison between
the at least one obtained environment parameter or environment parameter profile determined on the basis of the at least one obtained environment parameter [e.g. determined temperature profile], and
an environment parameter reference profile which describes an expected environment parameter or an expected environment parameter profile [e.g. expected temperature profile] [e.g. over a time period] in the environment of the data transmitter.

In exemplary embodiments, the determined environment parameter profile can further be based on [e.g. temporally] at least one previously obtained [e.g. received and/or determined] environment parameter.

In exemplary embodiments, the at least one signal can have the respective environment parameter in modulated primary information, wherein the data receiver is configured to extract the respective signal parameter from the modulated primary information [e.g. through demodulation and decoding] in order to obtain the at least one environment parameter.

The at least one signal can, for example, have a data packet, wherein the data packet has the respective environment parameter or information relating to the respective environment parameter.

In exemplary embodiments, the at least one signal or a generation of the at least one signal can be dependent on a clock signal of a clock generator [e.g. a frequency generator, such as e.g. an oscillator or crystal] of the data transmitter, wherein the data transmitter is configured to determine [e.g. evaluate] a signal parameter [e.g. a signal characteristic] of the respective signal and, on the basis of this signal parameter, to determine [e.g. to estimate] the respective environment parameter [e.g. temperature or temperature change] to which the clock generator of the data transmitter or the respective signal is exposed.

In accordance with a further embodiment of the invention, the data receiver can be configured to combine the at least one environment parameter extracted from the modulated primary information and the at least one environment parameter determined on the basis of the signal parameter in order to obtain the at least one combined environment parameter, wherein the data receiver can be configured to identify an operational state of the data transmitter or of a component of the data transmitter on the basis of a comparison between
the at least one combined environment parameter or an environment parameter profile determined on the basis of the at least one combined environment parameter [e.g. determined temperature profile], and
the environment parameter reference profile which describes the expected environment parameter or the expected environment parameter profile [e.g. expected temperature profile] in the environment of the data transmitter.

In exemplary embodiments, the environment parameter reference profile can be determined in advance.

The environment parameter reference profile can be determined, for example, during the manufacture of the data transmitter.

In exemplary embodiments, the data receiver can be configured to adapt [e.g. to update] the environment parameter reference profile on the basis of previously obtained environment parameters.

In exemplary embodiments, the data receiver can be configured to generate the environment parameter reference profile on the basis of obtained environment parameters of a different data transmitter or a group of different data transmitters.

The data receiver can be configured, for example, to collect environment parameters of a different data transmitter or a group of different data transmitters over a time period in order to determine the environment parameter reference profile on the basis of the environment parameters [e.g. on the basis of statistical methods, for example through averaging and/or interpolation].

In exemplary embodiments, the data receiver can be configured to identify a defective operational state of the data transmitter or of a component of the data transmitter on the basis of the comparison.

An excessive deviation—i.e., a deviation which is greater than or equal to a predefined threshold value—for example, between
- the at least one obtained environment parameter or the environment parameter profile determined on the basis of the at least one obtained environment parameter [e.g. determined temperature profile], and
- the environment parameter reference profile which describes the expected environment parameter or the expected environment parameter profile [e.g. expected temperature profile] [e.g. over a time period] in the environment of the data transmitter, can indicate a defective operational state of the data transmitter or of a component [e.g. a battery] of the data transmitter.

In exemplary embodiments, the data receiver can be configured to estimate the service life of a component [e.g. battery service life] of the data transmitter on the basis of the comparison.

In exemplary embodiments, the data receiver can further be configured to determine at least one signal parameter of the at least one signal, wherein the data receiver can be configured to identify the operational state [e.g. a fault-free or a defective operational stage] of the data transmitter or of a component [e.g. a battery] of the data transmitter on the basis of a comparison between
- the at least one determined signal parameter or a signal parameter profile determined on the basis of the at least one determined signal parameter, and
- a signal parameter reference profile which describes the expected signal parameter or an expected signal parameter profile [e.g. over a time period].

In exemplary embodiments, the determined signal parameter profile can furthermore be based on [e.g. temporally] at least one previously determined signal parameter.

In exemplary embodiments, the at least one signal or a generation of the at least one signal can be dependent on a clock signal of a clock generator [e.g. a frequency generator, such as e.g. an oscillator or crystal] of the data transmitter, wherein the data receiver is configured to determine a signal parameter [e.g. a carrier frequency] for the respective signal [e.g. during the reception of the respective signal] multiple times in order to determine a profile of the signal parameter and, on the basis of the determined profile of the signal parameter, to determine [e.g. to estimate] the environment parameter profile to which the clock generator or the data transmitter of the respective signal is exposed, wherein the data receiver can be configured to identify the operational state [e.g. a fault-free or a defective operational state] of the data transmitter or of the component of the data transmitter on the basis of the comparison between
- the determined environment parameter profile, and
- the environment parameter reference profile which describes an expected environment parameter profile during the transmission of the respective signal.

In accordance with a further embodiment of the invention, the environment parameter reference profile can take into account delays in an impact of environment parameter changes on the clock generator.

In accordance with another feature of the invention, the data receiver can be configured to determine a signal parameter of the respective signal and to determine a component installed on the data transmitter [e.g. module, e.g. frequency crystal, time crystal, PLL loop] on the basis of the determined signal parameter or a change in the signal parameter.

It is possible to determine, for example, which component, e.g. which or which type of crystal, is installed on the data transmitter on the basis of the determined signal parameter or the change in the signal parameter.

In exemplary embodiments, the at least one signal can have information relating to the installed component in modulated primary information, wherein the data receiver can be configured to carry out a cross-check with the installed component determined via the signal parameter or the change in the signal parameter on the basis of the information relating to the installed component.

In exemplary embodiments, the data receiver can be configured to identify a manipulation or incorrect installation of the data transmitter on the basis of the determined installed component.

In accordance with a further feature of the invention, the signal parameter can be any one or more of the following: a receive carrier frequency, a receive time, a receive symbol rate, a receive modulation index, a Doppler frequency, a signal-to-noise ratio, a signal power, a channel phase, a channel attenuation, a channel dispersion, and/or a polarization rotation, or a change therein.

In accordance with yet a further feature of the invention, the environment parameter can be a temperature, a relative humidity, an atmospheric pressure, an electromagnetic radiation, a brightness, a movement, and/or a vibration, or a change therein.

In exemplary embodiments, the data receiver can be a data receiver of a wireless communication system, the data receiver can be a base station, or the data transmitter can be a sensor node.

With the above and other objects in view there is also provided a data receiver. The data receiver is configured to receive at least one signal from a data transmitter, wherein the at least one signal in each case has an environment parameter measured by the data transmitter [e.g. by means of a sensor] in modulated primary information, wherein the data receiver is configured to extract the respective measured environment parameter from the respective modulated primary information [e.g. through demodulation and decoding] in order to obtain at least one measured environment parameter, wherein the at least one signal or a generation of the at least one signal is dependent on a clock signal of a clock generator [e.g. of a frequency generator, such as e.g. an oscillator or crystal] of the data transmitter, wherein the data receiver is configured in each case to determine [e.g. to evaluate] a signal parameter [e.g. a signal characteristic] of the at least one signal and, on the basis of the respective signal parameter, to estimate a respective environment parameter [e.g. temperature or temperature change] to which the clock generator of the data transmitter or the respective signal is exposed, in order to obtain at least one estimated environment parameter, wherein the data receiver is configured to identify [e.g. to determine] an operational state [e.g. a fault-free or a defective operational state] of the data transmitter or of a component [e.g. a battery] of the data transmitter on the basis of a comparison between the at least one measured environment parameter and the at least one estimated environment parameter.

Further exemplary embodiments provide a method for determining an operational state of a data transmitter or of a component of the data transmitter. The method comprises a step of receiving at least one signal from a data transmitter in order to obtain at least one environment parameter of the data transmitter or of an environment of the data transmitter. The method further comprises a step of determining an operational state of the data transmitter or of a component of the data transmitter on the basis of a comparison between the at least one environment parameter or an environment parameter profile determined on the basis of the at least one environment parameter, and an environment parameter reference profile which describes an expected environment parameter or an expected environment parameter profile in the environment of the data transmitter.

In exemplary embodiments, the step of receiving the at least one signal can be carried out by a base station of a communication system.

In exemplary embodiments, the step of determining the deviation of the data transmitter from a reference operational state is carried out by the data receiver or by a server [e.g. headend] of the communication system.

Further exemplary embodiments provide a method for determining an operational state of a data transmitter or of a component of the data transmitter. The method comprises a step of receiving at least one signal from a data transmitter, wherein the at least one signal or a generation of the at least one signal is dependent on a clock signal of a clock generator, wherein the at least one signal has an environment parameter measured by the data transmitter in modulated primary information. The method further comprises a step of extracting the measured environment parameter from the modulated primary information of the at least one signal in order to obtain at least one measured environment parameter. The method further comprises a step of determining a signal parameter of the at least one signal. The method further comprises a step of estimating, on the basis of the determined signal parameter, an environment parameter to which the clock generator of the data transmitter or the respective signal is exposed, in order to obtain at least one estimated environment parameter. The method further comprises a step of comparing the at least one measured environment parameter and the at least one estimated environment parameter in order to identify an operational state of the data transmitter or of a component of the data transmitter.

With the above and other objects in view there is provided, in accordance with the invention, a server. The server is configured to obtain at least one environment parameter [e.g. temperature] of the data transmitter or of an environment of the data transmitter, wherein the server is configured to identify an operational state [e.g. a fault-free or a defective operational state] of the data transmitter or of a component [e.g. a battery] of the data transmitter on the basis of a comparison between the at least one environment parameter or an environment parameter profile determined on the basis of the at least one environment parameter, and a reference profile which describes an expected environment parameter profile in the environment of the data transmitter.

By monitoring environment parameters, exemplary embodiments enable the identification of data transmitters (e.g. sensor nodes) which are defective or have defective components, are installed at incorrect locations or have incorrect firmware or hardware.

In exemplary embodiments, available transmit parameters are used.

In exemplary embodiments, short-term or long-term profiles are stored.

In exemplary embodiments, (e.g. determined environment parameters) of different nodes are compared with one another and adaptive profiles are generated.

In exemplary embodiments, different profiles are used for different times of the day and/or times of the year.

In exemplary embodiments, a defect can be identified if e.g. a profile (determined environment parameter profile) exceeds a threshold value.

Exemplary embodiments provide a data receiver, wherein the data receiver is designed to receive a signal from a data transmitter, wherein the signal or a generation of the signal is dependent on a clock signal of a clock generator [e.g. a frequency generator, such as e.g. an oscillator or crystal] of the data transmitter, wherein the data receiver is designed to determine [e.g. to evaluate] a signal parameter [e.g. a signal characteristic] of the signal and, on the basis of the signal parameter, to determine [e.g. to estimate] an environment parameter [e.g. a temperature or temperature change] to which the clock generator of the data transmitter or the signal is exposed.

The present invention is based on the idea of defining environment parameters [e.g. temperature, pressure, relative humidity or a change therein] by evaluating receive parameters. The signal parameters of the received signal (receive parameters) depend on a clock signal of a clock generator [e.g. a frequency of a frequency generator] on the basis of which the data transmitter generates the signal, wherein the clock signal provided by the clock generator of the data transmitter is dependent on the environment parameters in the environment of the data transmitter.

In exemplary embodiments, the signal parameter can be independent from a modulation content of the signal.

In exemplary embodiments, the signal can be a digitally modulated signal, wherein the data receiver can be designed to determine an analog signal parameter [e.g. an analog signal characteristic] of the digitally modulated signal.

In exemplary embodiments, the signal parameter can be independent from a modulation content of the digitally modulated signal.

In exemplary embodiments, the data receiver can be designed to use known symbols [e.g. pilot symbols] in the signal in order to determine the signal parameter.

In exemplary embodiments, the known symbols can be divided into groups, wherein the groups of symbols can be located at different positions in the signal [e.g. at the start and the end].

In exemplary embodiments, the data receiver can be designed to use at least four (4) known symbols, preferably 20 known symbols and particularly preferably 40 known symbols, in order to determine the signal parameter.

In exemplary embodiments, the signal can have a plurality of sub-data packets, wherein the known symbols are divided over a plurality of sub-data packets.

In exemplary embodiments, the data receiver can be designed to use no known symbols in order to determine the signal parameter.

In exemplary embodiments, the signal can have information relating to the environment parameter in the signal parameter along with modulated primary information [e.g. an ID of the data transmitter, a synchronization sequence, payload data and/or dummy data].

In exemplary embodiments, the signal can be transmitted at certain time intervals [e.g. equal or unequal time intervals], wherein a transmission of the signal or a proper subset of the transmissions of the signal can additionally have information relating to the environment parameter [e.g. a sensor-defined version of the environment parameter] in the modulated primary information, wherein the data receiver can be designed to calibrate the determination [e.g. estimation or derivation] of the environment parameter on the basis of the signal parameter based on the information relating to the environment parameter contained in the modulated primary information.

The data receiver can be designed, for example, to receive the signal in a plurality of time segments of a sequence of time segments, wherein the signal received in a first subset of time segments of the sequence of time segments additionally has information relating to the environment parameter [e.g. a sensor-defined version of the environment parameter] in the modulated primary information, wherein the data receiver is designed to calibrate the determination [e.g. estimation or derivation] of the environment parameter on the basis of the signal parameter based on the information relating to the environment parameter contained in the modulated primary information, wherein the signal received in a second subset of time segments of the sequence of time segments contains no information relating to the environment parameter in the modulated primary information, wherein the first subset of time segments in the second subset of time segments are disjoint.

In exemplary embodiments, the modulated primary information can contain no information relating to the environment parameter.

In exemplary embodiments, the data receiver can be designed to determine the environment parameter from the signal parameter on the basis of a mapping function.

In exemplary embodiments, the mapping function can be known to the data receiver.

In exemplary embodiments, the data receiver can be designed to calibrate the mapping function on the basis of at least one information element defined by a sensor and relating to the environment parameter.

In exemplary embodiments, the data receiver can be designed to determine the mapping function on the basis of at least two information elements defined by a sensor and relating to the environment parameter.

In exemplary embodiments, the data receiver can be designed to determine the mapping function on the basis of a polynomial approximation depending on the at least two information elements defined by the sensor and relating to the environment parameter.

In exemplary embodiments, the data receiver can be designed to select the mapping function from a set of mapping functions on the basis of at least one information element defined by a sensor and relating to the environment parameter.

In exemplary embodiments, the data receiver can be designed to determine a mean value and a variance for at least two information elements defined by the sensor and relating to the environment parameter, wherein the data receiver can be designed to select the mapping function from the set of mapping functions on the basis of the mean value and the variance.

In exemplary embodiments, the signal can be transmitted at certain time intervals [e.g. equal or unequal time intervals, wherein at least one transmission of the signal or a proper subset of the transmissions of the signal [e.g. in the modulated primary information] has the at least one information element defined by the sensor and relating to the environment parameter.

In exemplary embodiments, the mapping function can be a temperature curve of the clock generator of the data transmitter.

In exemplary embodiments, the signal can be transmitted at certain time intervals [e.g. equal or unequal time intervals], wherein the data receiver can be designed to determine at least two signal parameters on the basis of at least two transmissions of the signal, wherein the data receiver can be designed to determine the environment parameter on the basis of the at least two signal parameters.

In exemplary embodiments, the data receiver can be designed to combine the at least two signal parameters [e.g. through subtraction] in order to obtain a combined signal parameter, wherein the data receiver can be designed to determine the environment parameter on the basis of the combined signal parameter.

In exemplary embodiments, the data receiver can be designed to determine at least two signal parameters [e.g. frequency and modulation error] of the signal, wherein the data receiver can be designed in each case to determine [e.g. to estimate], on the basis of the at least two signal parameters, an environment parameter [e.g. a temperature or temperature change] to which the clock generator of the data transmitter or the signal is exposed.

The data receiver can, for example, determine the same environment parameters [e.g. temperatures or temperature differences] or different environment parameters [e.g. temperature and pressure, or temperature difference and pressure difference] on the basis of the at least two signal parameters.

In exemplary embodiments, the data receiver can be designed to combine the determined environment parameters [e.g. through averaging] in order to obtain a combined environment parameter.

In exemplary embodiments, the signal or a generation of the signal can furthermore be dependent on a further clock signal of a further clock generator [e.g. frequency generator and timer] of the data transmitter, wherein the data receiver can be designed to determine two signal parameters of the signal and to determine the environment parameter on the basis of the two signal parameters.

In exemplary embodiments, the signal can be transmitted at certain time intervals [e.g. equal or unequal time intervals], wherein at least one transmission of the signal or a proper subset of the transmissions of the signal [e.g. in the modulated primary information] has information relating to a deviation of the two clock generators of the data transmitter, wherein the data receiver can be designed to calibrate the determination of the environment parameter on the basis of the deviation of the two clock generators of the data transmitter.

The deviation of the two clock generators of the data transmitter can indicate, for example, the current difference between the frequencies of the two clock generators. The two clock generators [e.g. crystals] can, for example, be measured against one another in order to establish a value [e.g. in ppm, such as e.g. 20 ppm] which indicates the amount of divergence between the two clock generators. The value can also be transmitted. The data receiver [e.g. base station] can estimate the time [receive time] and frequency [receive frequency] and can use the information to define/calibrate the crystal temperature curves of the time crystal or the frequency crystal at the node.

In exemplary embodiments, the data receiver can be designed to receive a further signal from a further data transmitter, wherein the further signal or a generation of the further signal is dependent on a clock signal of a clock generator of the further data transmitter, wherein the data transmitter and the further data transmitter are essentially exposed to the same environment parameter [e.g. are disposed in the same room], wherein the data receiver can be designed to determine a further signal parameter of the further signal and to determine the environment parameter on the basis of the signal parameter and the further signal parameter.

In exemplary embodiments, the data receiver can be designed to combine the signal parameter and the further signal parameter in order to obtain a combined signal parameter and to determine the environment parameter on the basis of the combined signal parameter.

In exemplary embodiments, the signal parameter and the further signal parameter can individually enable the determination of a relative environment parameter [e.g. temperature changes], wherein the data receiver can be designed to determine an absolute environment parameter on the basis of the signal parameter and the further signal parameter in combination.

In exemplary embodiments, the data transmitter and the further data transmitter can belong to different radio systems [e.g. are data transmitters of different radio systems].

In exemplary embodiments, the clock signal of the clock generator can be dependent on the environment parameter.

In exemplary embodiments, the data receiver can be designed to compensate an age-related effect of the clock generator on the signal parameter.

The age-related effect of the clock generator can, for example, be known to the data receiver. Furthermore or alternatively, the data receiver can be designed to determine or to estimate the age-related effect of the clock generator on the signal parameter, e.g. on the basis of at least two consecutive received signals of the data transmitter.

In exemplary embodiments, the data receiver can be designed to compensate a component-spread-related effect of the clock generator on the signal parameter.

In exemplary embodiments, the signal parameter can be a receive carrier frequency, a receive time, a receive symbol rate, a receive modulation index, a Doppler frequency, a signal-to-noise ratio, a signal power, a channel phase, a channel attenuation, a channel dispersion, and/or a polarization rotation or a change therein.

In exemplary embodiments, the environment parameter can be a temperature, a relative humidity, an atmospheric pressure, an electromagnetic radiation, a brightness, a movement, and/or a vibration, or a change therein.

Further exemplary embodiments provide a system having a data receiver according to one of the exemplary embodiments described herein and a data transmitter, wherein the data transmitter can be designed to transmit the signal, wherein the signal or the generation of the signal is dependent on the clock signal of the clock generator of the data transmitter.

In exemplary embodiments, the data transmitter can be designed to transmit the signal at certain time intervals [e.g. equal or unequal time intervals], wherein the data transmitter can be designed to provide at least one transmission of the signal or a proper subset of the transmissions of the signal with information defined by a sensor and relating to the environment parameter.

Further exemplary embodiments provide a method. The method comprises a step of receiving a signal from a data transmitter, wherein the signal or a generation of the signal is dependent on a clock signal of a clock generator [e.g. a frequency generator, such as e.g. an oscillator or crystal] of the data transmitter. The method further comprises a step of determining [e.g. estimating] a signal parameter [e.g. a signal characteristic] of the received signal. The method further comprises a step of determining, on the basis of the determined signal parameter, an environment parameter [e.g. a temperature or temperature change] to which the clock generator of the data transmitter or the signal is exposed.

In exemplary embodiments, an effect of the environment on the clock generator of the data transmitter can be greater at least by a factor of two or preferably by a factor of four than an effect of the environment on a clock generator of a data receiver which receives the signal from the data transmitter.

In exemplary embodiments, an effect of the environment on a clock generator of a data receiver which receives the signal from the data transmitter can be greater at least by a factor of two or preferably by a factor of four than an effect of the environment on the clock generator of the data transmitter.

Further exemplary embodiments provide a method for determining environment parameters of an area (e.g. of a site or building). The method comprises a step of receiving a plurality of signals from a plurality of data transmitters which are disposed in the area, wherein the plurality of signals are dependent on clock signals from clock generators of the respective data transmitters. The method further comprises a step of determining signal parameters (e.g. signal characteristics, such as e.g. carrier frequencies or carrier frequency deviations) of the plurality of received signals. The method further comprises a step of determining at least one environment parameter of the area to which the clock generators of the data transmitters are exposed, on the basis of the determined signal parameters.

In exemplary embodiments, the signal parameters can be independent from modulation contents of the plurality of signals.

In exemplary embodiments, the plurality of signals can be digitally modulated signals, whereby analog signal parameters of the plurality of digitally modulated signals are determined during the determination of signal parameters.

The signal parameters can, for example, be independent from modulation contents of the plurality of digitally modulated signals.

In exemplary embodiments, along with respective modulated primary information [e.g. IDs of the respective data transmitters, synchronization sequences, payload data and/or dummy data], the plurality of signals can have information relating to the at least one environment parameter of the area in the respective signal parameters.

In exemplary embodiments, the method can have a step of combining the determined signal parameters in order to obtain at least one combined signal parameter, wherein the at least one environment parameter is determined on the basis of the at least one combined signal parameter.

In exemplary embodiments, at least two groups [e.g. proper subsets [e.g. disjoint or overlapping subsets]] of signal parameters can be combined during the combination of the determined signal parameters in order to obtain at least two combined signal parameters for the at least two groups of signal parameters, wherein the at least one environment parameter of the area is determined on the basis of the at least two combined signal parameters.

For example, at least two groups of different signal parameters [e.g. first group: carrier frequencies (or carrier frequency deviations); second group: signal powers] can be combined in order to obtain at least two different combined signal parameters. At least two groups of identical signal parameters [e.g. first group: carrier frequencies (or carrier frequency deviations); second group: carrier frequencies (or carrier frequency deviations)] can obviously also be combined in order to obtain at least two identical combined signal parameters.

An environment parameter of the area, for example, can be determined for each of the at least two combined signal parameters in order to obtain at least two environment parameters [e.g. different environment parameters [e.g. temperature, air pressure, relative humidity] or identical environment parameters [e.g. temperatures, air pressures, relative humidities]] of the area. The at least two environment parameters [e.g. in the case of identical environment parameters] can optionally be combined in order to obtain a combined environment parameter. A plurality of (different) environment parameters can obviously also be determined (in each case) on the basis of the at least two combined signal parameters.

In exemplary embodiments, all determined signal parameters [e.g. the set of determined signal parameters] or a group of signal parameters [e.g. a (proper) subset of determined signal parameters] can be combined when the determined signal parameters are combined in order to obtain a combined signal parameter, wherein the at least one environment parameter is determined on the basis of the one combined signal parameter.

An environment parameter, for example, or a plurality of (different) environment parameters can be determined on the basis of the one combined signal parameter.

In exemplary embodiments, the method can have a step of combining the determined signal parameters in order to determine a proportional mapping onto at least two environment parameters.

Two environment parameters, for example, can influence the same signal parameter, as a result of which, in the case of a single signal parameter, no unique mapping onto an environment parameter is possible.

In exemplary embodiments, the signal parameters can be combined on the basis of an averaging, weighting or filtering.

In exemplary embodiments, at least two environment parameters of the area can be determined when the at least one environment parameter is determined, wherein the method further has a step of combining the environment parameters in order to obtain at least one combined environment parameter of the area.

One environment parameter can be determined in each case, for example, at least for a subset of the determined signal parameters [e.g. one environment parameter for each determined signal parameter]. It is obviously also possible for at least two groups [e.g. proper subsets [e.g. disjoint or overlapping subsets]] of signal parameters to be combined in advance in order to obtain at least two combined signal parameters for the at least two groups of signal parameters, wherein one environment parameter is determined in each case for at least two of the combined signal parameters. More than one environment parameter [e.g. temperature, air pressure, etc.] can also optionally be determined for each signal parameter or for each combined signal parameter.

In exemplary embodiments, at least two environment parameters of the area can be determined when the at least one environment parameter is determined, wherein the method further has a step of determining a distribution of environment parameters in the area on the basis of the at least two environment parameters or combined environment parameters.

In exemplary embodiments, at least two combined environment parameters of the area can be determined when the at least one combined environment parameter is determined, wherein the method further has a step of determining a distribution of environment parameters in the area on the basis of the at least two combined environment parameters.

In exemplary embodiments, the method can further have a step of determining at least one environmental condition [e.g. earthquake, storm, rain, traffic jam] of the area on the basis of the determined distribution of environment parameters.

In exemplary embodiments, the method can further have a step of optimizing a transmission method of a communication system which is disposed in the area [e.g. a communication system with at least some of the data transmitters and the data receiver and at least one further data receiver] on the basis of the determined distribution of environment parameters.

In exemplary embodiments, the method can further have a step of optimizing a routing of data packets of a communication system which is disposed in the area [e.g. a communication system with at least some of the data transmitters and the data receiver and at least one further data receiver] on the basis of the determined distribution of environment parameters.

In exemplary embodiments, at least some of the plurality of data transmitters can be meters and/or sensors, wherein the method further has a step of optimizing a reading route for reading meters and/or sensors on the basis of the determined distribution of environment parameters.

In exemplary embodiments, the method can further have a step of optimizing a direction of maximum radiation of an antenna of the data receiver [e.g. base station] or of a different data receiver [e.g. a different base station] on the basis of the determined distribution of environment parameters.

In exemplary embodiments, the plurality of data transmitters can belong to at least two different radio systems [e.g. WLAN, Bluetooth, ZigBee] [e.g. are data transmitters of different radio systems].

In exemplary embodiments, the plurality of signals can be received by at least two base stations.

A first group [e.g. (proper) subset] of signals, for example, can be received by a first base station, wherein a second group [e.g. (proper) subset] of signals can be received by a second base station.

In exemplary embodiments, at least two of the base stations can belong to different radio systems [e.g. WLAN, Bluetooth, ZigBee] [e.g. are base stations of different radio systems].

In exemplary embodiments, the signal parameters can be determined by at least one base station.

In exemplary embodiments, the environment parameters can be determined by at least one base station or a server [e.g. head end] connected to the at least one base station.

In exemplary embodiments, the at least one environment parameter can be determined on the basis of at least one mapping function.

In exemplary embodiments, the at least one mapping function can be determined or calibrated on the basis of information from at least two data transmitters [e.g. on the basis of signal parameters from signals of the at least two data transmitters or a combined signal parameter, or on the basis of at least one environment parameter which has been determined on the basis of the signal parameters or the combined signal parameter].

In exemplary embodiments, the at least one environment parameter can be determined on the basis of a combined mapping function, wherein the combined mapping function can be determined by combining at least two mapping functions from at least two data transmitters.

In exemplary embodiments, the at least two data transmitters can essentially have the same clock generators [e.g. from the same production series [batch]].

In exemplary embodiments, the mapping functions can be temperature curves of the clock generators of the data transmitters.

In exemplary embodiments, the at least one environment parameter can be determined on the basis of different signal parameters [e.g. carrier frequencies and receive times].

In exemplary embodiments, the signal parameters can be receive carrier frequencies, receive times, receive symbol rates, receive modulation indices, Doppler frequencies, signal-to-noise ratios, signal powers, channel phases, channel attenuations, channel dispersions, and/or polarization rotations, or a change therein.

According to a further feature of the invention, the at least one environment parameter can be a temperature, a relative humidity, an atmospheric pressure, an electromagnetic radiation, a brightness, a movement, and/or a vibration, or a change therein.

In exemplary embodiments, the plurality of data transmitters can belong to a reading or measuring system, wherein the plurality of signals can have read or measured values as [e.g. modulated] primary information, wherein the method can have a step of adjusting the measured or read values on the basis of the at least one environment parameter of the area.

The accuracy of the measured or read values, for example, can be improved on the basis of the at least one environment parameter. Measurement errors, for example, of the read or measured values can be corrected on the basis of the at least one environment parameter.

Further exemplary embodiments provide a base station, wherein the base station is designed to receive a plurality of signals from a plurality of data transmitters which are disposed in an area, wherein the plurality of signals are dependent on clock signals of clock generators of the respective data transmitters, wherein the base station is designed to determine signal parameters [e.g. signal characteristics, such as e.g. carrier frequencies or carrier frequency deviations] of the plurality of received signals, and wherein the base station is designed to determine, on the basis of the determined signal parameters, at least one environment parameter of the area to which the clock generators of the data transmitters are exposed.

Further exemplary embodiments provide a server, wherein the server is designed to obtain signal parameters of a plurality of signals of a plurality of data transmitters, wherein the plurality of signals are dependent on clock signals from clock generators of the respective data transmitters, wherein the plurality of data transmitters are disposed in an area, wherein the server is designed to determine, on the basis of the determined signal parameters, at least one environment parameter of the area to which the clock generators of the data transmitters are exposed.

Other features which are considered as characteristic for the invention are set forth in the appended claims.

Although the invention is illustrated and described herein as embodied in a data receiver and a method for identifying an operational state of a data transmitter by monitoring environment parameters, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

In the following description of the exemplary embodiments of the present invention, the same elements or elements producing the effect are denoted in the figures with the same reference number so that their descriptions are interchangeable.

In typical radio systems, a reference frequency is required in order to generate transmission signals, the respective radio chip of the respective front end deriving the necessary timing signals from the reference frequency. This reference frequency is typically made available by a clock generator, such as e.g. an oscillating crystal [1]. Data transmitters, such as e.g. nodes or sensor nodes, normally comprise two different clock generators. This can, for example, be a high-frequency (HF) clock generator which oscillates at a frequency of several MHz, and a low-frequency (LF) clock generator which normally oscillates at a frequency of 32768 Hz. The high-frequency clock generator is normally more precise (in terms of the deviation from the nominal frequency), but consumes more power. The low-frequency clock generator is less precise, but consumes much less power.

Figure 1:
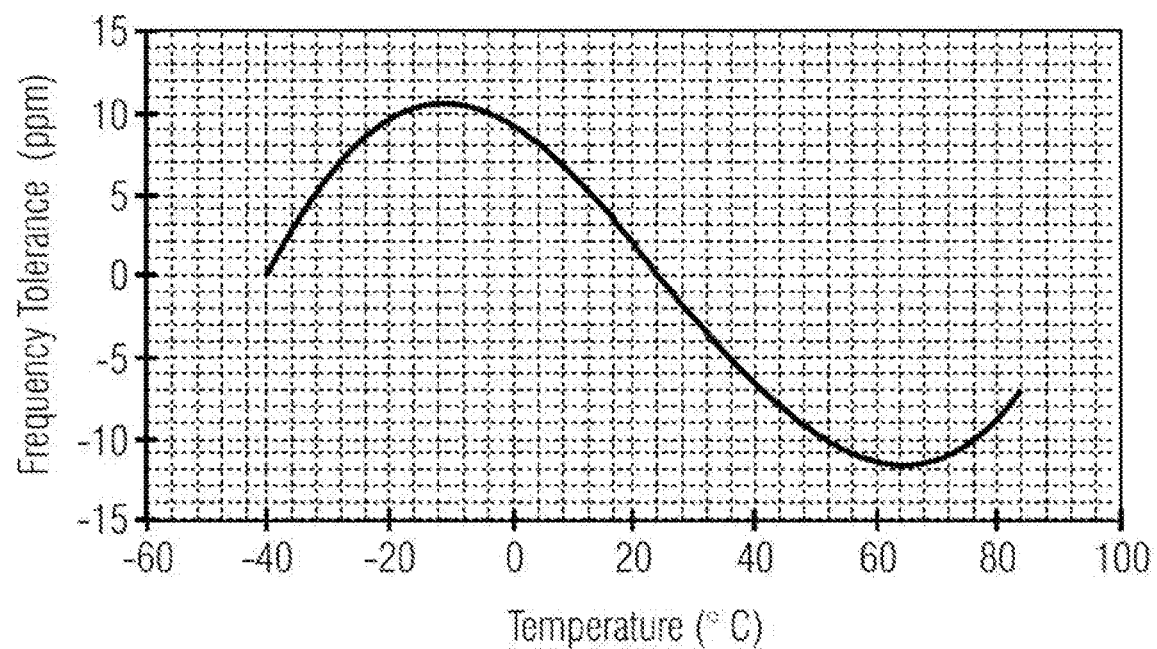
FIG. 1 is a diagram showing a deviation of a high-frequency clock generator from a reference frequency as a function of temperature.
Figure 2:
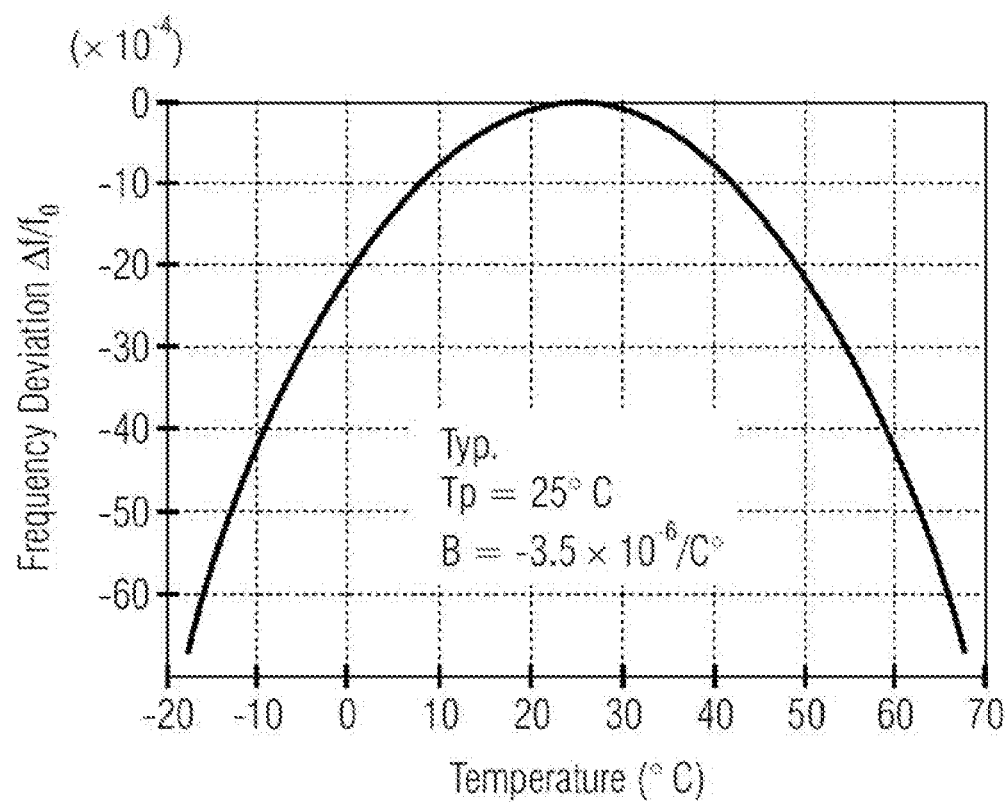
FIG. 2 is a diagram showing a deviation of a low-frequency clock generator from a reference frequency depending on temperature.

Referring now to the figures of the drawing in detail and first, particularly, to FIGS. 1 and 2 thereof, the reference frequencies made available by the clock generators (oscillating crystals) are typically dependent on environmental parameters. FIG. 1 shows an example of the temperature dependency of the reference frequency over temperature for a random high-frequency clock generator (frequency stability of a high-frequency oscillating crystal over ambient temperature [2]), whereas FIG. 2 shows an example of the temperature dependency of the reference frequency for a random low-frequency clock generator (frequency stability of a low-frequency (LF) 32768 kHz crystal over temperature [5]). The y-axes in each case describe the frequency tolerance in ppm and the x-axes in each case represent the temperature in ° C.

Along with temperature, there are further dependencies of the clock generator (crystal) on at least the following parameters:
relative humidity
pressure
EM radiation
brightness
vibration/movement All these parameters have an influence on the reference frequency made available by the clock generator (oscillating crystal). If this reference frequency is used to generate the transmission signals, these dependencies have a direct effect on the transmission signal and therefore on the transmission parameters (signal characteristics). The following transmission parameters are particularly important:
transmit frequency,
transmit time,
symbol rate,
modulation index (in the case of frequency shift keying methods, such as FSK or GMSK),
Doppler (in the case of vibration/movement only)

Environmental conditions of the transmitter therefore have an effect on the radiated radio signal in the generation and radiation of a radio signal in a transmitter. Particularly the oscillator frequency which serves as a reference for carrier frequencies or modulation frequencies in the transmitter can be changed due to environment effects. The frequency correlates, for example, with the environment temperature in the case of oscillators (crystals) which are not temperature-corrected. Similar effects can also occur for relative humidity, electromagnetic radiation, brightness or vibrations. In addition, movements or vibrations of the transmitter and its antenna have an effect in the radiated signal due to Doppler shifts.

Along with the primary information, the radiated signal carries further implicit information relating to the environmental conditions or characteristics of the transmitter due to these characteristics. This phenomenon is shown graphically in FIG. 3 for illustrative purposes.

Figure 3:
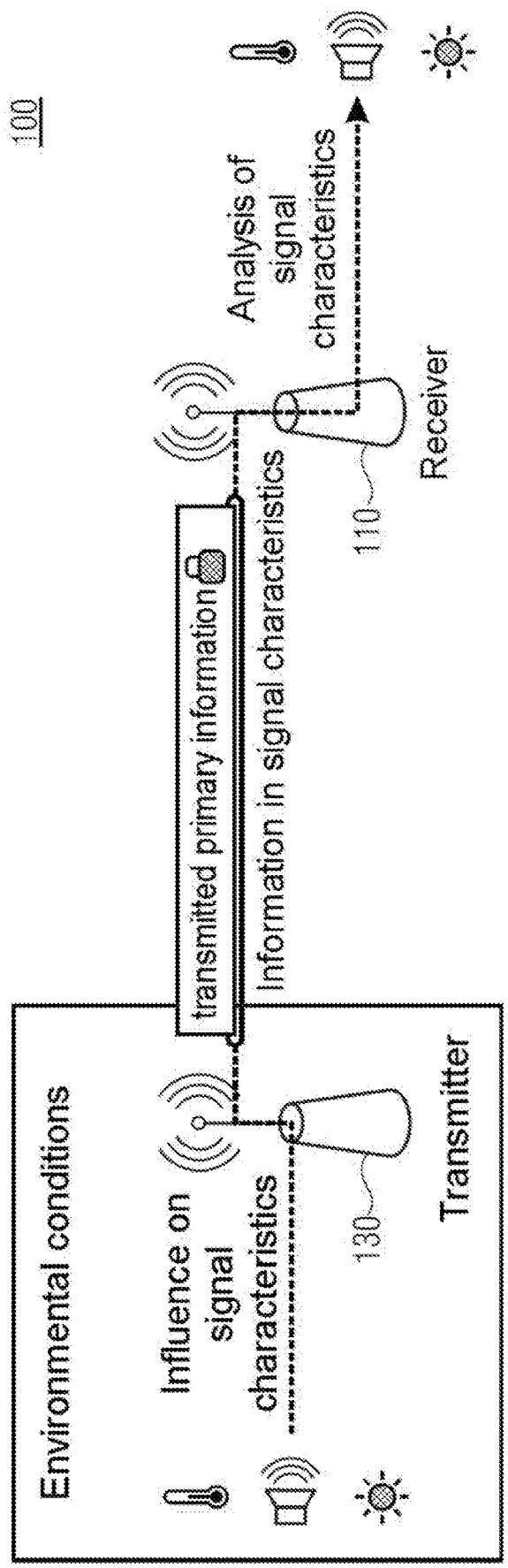
FIG. 3 shows a schematic view of a system with a data transmitter and a data receiver, according to one exemplary embodiment of the present invention.

FIG. 3 shows in detail a schematic view of a system 100 with a data transmitter 130 and a data receiver 110. As is evident in FIG. 3, the environmental conditions have an effect on the side of the data transmitter 130 on the signal 120 transmitted by the data transmitter 130, so that, along with primary information, the signal 120 additionally has information relating to the environmental conditions in the signal characteristics. In other words, FIG. 3 shows a radiocommunication between the transmitter 130 and the receiver 110, wherein the information relating to the signal characteristics is also shown along with the transmitted primary information.

If it is now possible to define (i.e. to estimate) the signal characteristics at the receiver 130, the environmental conditions at the transmitter 130, at the receiver 110 or in between can be inferred directly via the relationship between the signal characteristics and the environmental conditions. However, since the greatest tolerances will occur at the transmitter 130, environmental conditions are usually defined at the transmitter. The temperature can be determined at the transmitter, for example, from a defined frequency offset (deviation from the expected nominal frequency) via the curve shown in FIG. 1.

1. Determining Environment Parameters by Evaluating Receive Parameters

Exemplary embodiments of the present invention are described below in relation to the definition of environmental conditions from the signal characteristics and their evaluation.

Figure 4:
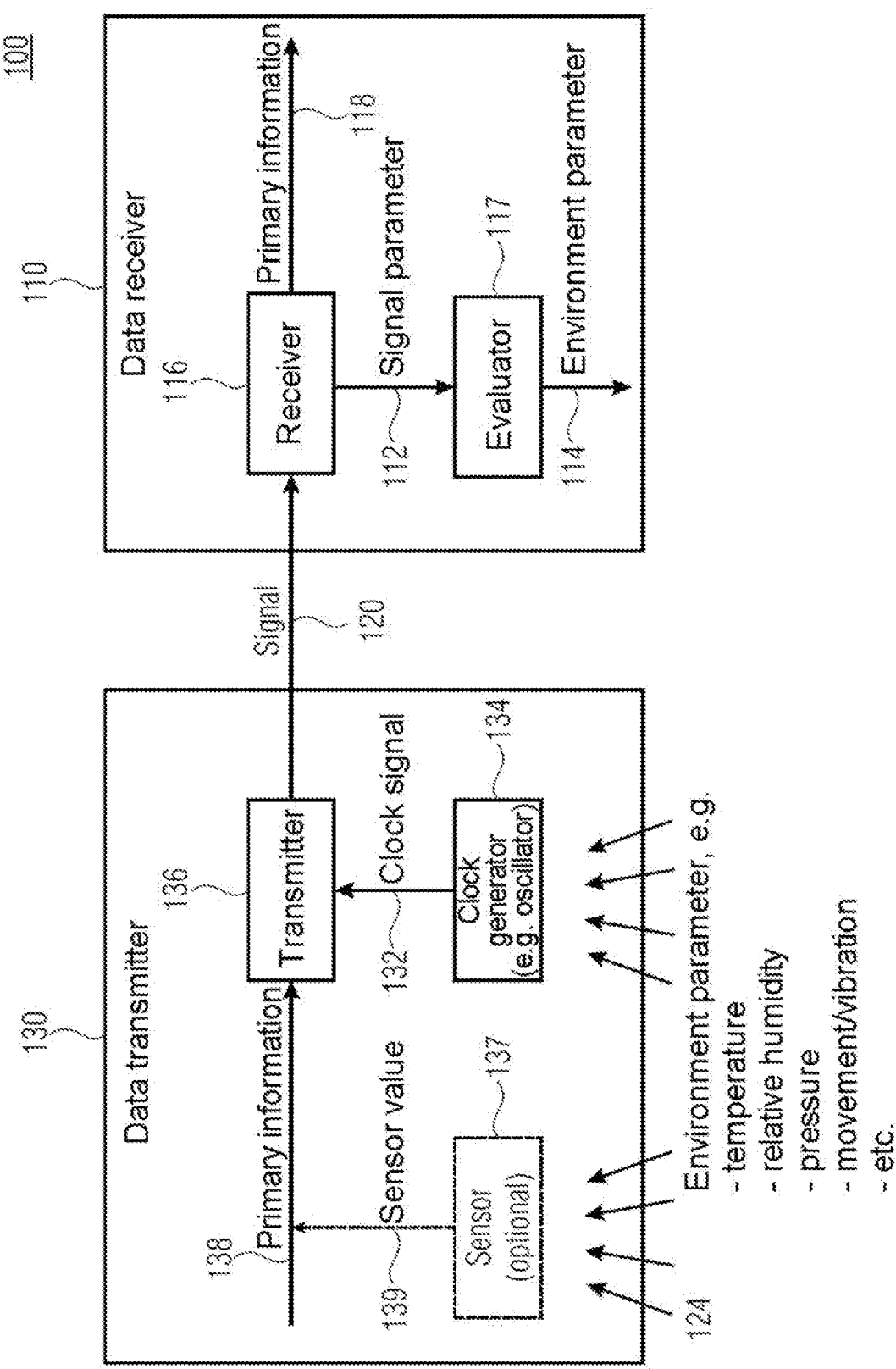
FIG. 4 shows a schematic block diagram of a system with a data receiver and a data transmitter, according to one exemplary embodiment of the present invention.

FIG. 4 shows a schematic block diagram of a system 100 with a data receiver 110 and a data transmitter 130, according to one exemplary embodiment of the present invention.

The data receiver 110 is designed to receive a signal 120 of the data transmitter 130, wherein the signal 120 is dependent on a clock signal 132 of a clock generator 134 (e.g. a frequency generator, such as e.g. an oscillator or crystal) of the data transmitter 130. The data receiver 110 is further designed to determine (e.g. to evaluate) a signal parameter 112 (e.g. a signal characteristic, such as e.g. a carrier frequency or carrier frequency deviation) of the signal 120 in order to determine (e.g. to estimate), on the basis of the signal parameter 112, an environment parameter (e.g. a temperature or temperature change) 114 to which the clock generator 134 of the data transmitter 130 and/or to which the signal 120 is/are exposed.

As shown byway of example in FIG. 4, the data transmitter 130 can have a transmitter 136 (radio chip/frontend) which is designed to generate the signal 120 (transmit signal), wherein the signal 120 is dependent on the clock signal 132 of the clock generator 134. The transmitter 136 can, for example, be timed with the clock signal 132 of the clock generator 134 so that the signal 120 is dependent on the clock signal 132 of the clock generator 134.

An environment parameter 124 (e.g. a temperature or temperature change) which has an effect on the clock generator 134 of the data transmitter 130 influences the clock generator 134 and therefore at least one signal parameter (e.g. frequency) of the clock signal 132 provided by the clock generator 134. Since the signal 120 transmitted by the data transmitter 130 is dependent on the clock signal 132, the environment parameter 124 influences not only a signal parameter (e.g. frequency) of the clock signal 132, but also a signal parameter (e.g. a signal characteristic, such as e.g. carrier frequency) of the signal 120 transmitted by the data transmitter 130.

The data receiver 110 can thus infer or estimate the environment parameter (e.g. temperature) in the environment of the data transmitter 130 by evaluating the signal parameter 112 of the received signal 120.

The signal parameter 112 is independent from a modulation content of the signal 120, such as e.g. modulated primary information which the signal 120 has.

The data transmitter 130 (or the transmitter 136 of the data transmitter 130) can be designed, for example, to modulate primary information 138 (e.g. an ID (=identifier) of the data transmitter 130, a synchronization sequence/pilot sequence, payload data and/or dummy data) so that the signal 120 has modulate primary information. However, along with the modulated primary information, the signal 120 additionally contains information relating to the environment parameter 124 (in the environment of the data transmitter 130) in the signal parameter 112 which the data receiver 110 can evaluate in order to infer the environment parameter 114.

As shown by way of example in FIG. 4, the data receiver 110 can have a receiver 116 which is designed to demodulate the received signal 120 in order to obtain the primary information 118 contained in the signal 120. The data receiver 110 (e.g. the receiver 116 of the data receiver 110) can further be designed to determine or evaluate the signal parameter 112 of the received signal 120 in order to obtain the additional information contained in the signal 120 and relating to the environment parameter 124. For this purpose, the data receiver 110 can, for example, have an evaluator 117 (e.g. a processor) which is designed to determine (e.g. to estimate) the environment parameter 114 on the basis of the signal parameter 112, for example on the basis of a mapping function which maps the signal parameter 112 onto the environment parameter 114.

In exemplary embodiments, the data transmitter 130 (or the transmitter 136 of the data transmitter 130) can be designed to provide a digitally modulated signal 120 as the signal 120. The data receiver 110 can be designed to determine an analog signal parameter 112 (e.g. an analog signal characteristic, such as e.g. a carrier frequency) of the digitally modulated signal 120 and to determine the environment parameter 114 on the basis of the analog signal parameter 112. The analog signal parameter 112 is independent from a modulation content of the digitally modulated signal 120, such as e.g. digitally modulated primary information which the signal 120 has.

In exemplary embodiments, it is thus possible to estimate the environment parameter in the environment of the data transmitter 130 on the basis of the (analog) signal parameter 112 without the environment parameter having to be transmitted explicitly in the modulation content of the signal 120, i.e. in the modulated primary information of the signal 120.

Although totally different payload data or only an ID of the data transmitter and/or a synchronization sequence/pilot sequence are therefore primarily transmitted with the signal 120, it is nevertheless possible to determine the environment parameter in the environment of the data transmitter 130 on the basis of the (analog) signal parameter 112.

The determination of the environment parameter in the environment of the data transmitter 130 on the basis of the (analog) signal parameter of the received signal 120 provides a wide range of possible applications.

According to exemplary embodiments, as shown byway of example in FIG. 4, the data transmitter 130 can thus have a sensor 137 for an environment parameter 124. Since the environment parameter can also be determined on the side of the data receiver 110 on the basis of the (analog) signal parameter 112 of the signal 120, it is no longer necessary to transmit the sensor value 139 regularly or with each transmission of the signal 120 in the modulated primary information of the signal 120. Instead, it suffices to transmit a synchronization sequence/pilot sequence and/or an ID of the data transmitter 130 or only dummy data with the signal 120 as modulated primary information. The amount of data transmitted with the signal 120 can thereby be reduced, as a result of which the energy required to transmit the signal 120 can also be reduced, which is advantageous, particularly for battery-operated data transmitters 130. The sensor 137 also no longer needs to be activated for each transmission of the signal 120, as a result of which energy consumption can be further reduced. Obviously, the sensor value 139 provided by the sensor 137 can additionally be transmitted in a transmission or in a small number (subset) of transmissions of the signal 120 in the modulated primary information also, and can be used on the side of the data receiver 110, for example for calibration or initialization. It is equally possible to dispense entirely with the sensor 137 for the environment parameter on the side of the data transmitter 130 and/or to determine the environment parameter on the side of the data receiver 110 exclusively on the basis of the determined signal parameter 112 of the received signal 120.

It is furthermore possible to use a data transmitter 130 which has a sensor 137 for a first environment parameter likewise as a sensor for a second environment parameter through the determination of the environment parameter on the side of the data receiver 110 on the basis of the (analog) signal parameter 112 of the signal 120. According to embodiments, the data transmitter 130 can, for example, have a sensor 137 for a first environment parameter 124 (e.g. relative humidity or pressure), wherein the data receiver 110 is designed to determine a second environment parameter (e.g. temperature) on the basis of the determined signal parameter 112 of the signal 120, wherein the first environment parameter and the second environment parameter are different.

It is furthermore possible to use a data transmitter 130 as a sensor for an environment parameter which has no sensor for the environment parameter through the determination of the environment parameter on the side of the data receiver 110 on the basis of the (analog) signal parameter 112 of the received signal 120.

In addition, it is possible to use an existing data transmitter 130 as a sensor for an environment parameter (e.g. as a temperature sensor), even though the data transmitter 130 per se is not provided as a sensor for the environment parameter, for example because the data transmitter 130 has no sensor for the environment parameter or because the data transmitter 130 cannot transmit the sensor value.

The data transmitter 130 and the data receiver 110 can optionally be designed to transmit or receive data 120 using the telegram splitting method. A telegram or data packet is divided here into a plurality of sub-data packets (or partial data packets or partial packets) and the sub-data packets are transmitted from the data transmitter 130 to the data receiver 110, distributed in time and/or are distributed in frequency according to a hopping pattern, wherein the data receiver 110 reassembles (or combines) the sub-data packets in order to obtain the data packet. Each of the sub-data packets contains only a part of the data packet. The data packet can further be channel-coded so that not all sub-data packets but only some of the sub-data packets are required for the error-free decoding of the data packet. The temporal distribution of the plurality of sub-data packets can be performed according to a time and/or frequency hopping pattern.

Detailed exemplary embodiments of the present invention are described below.

1.1 Determining the Receive Parameters and Mapping them onto Environment Parameters (Temperature)

Some receivers already have estimation methods which can very precisely estimate the receive parameters (signal parameters of the received signal 120). Other receivers can be upgraded with estimation methods of this type. Typical receive parameters which can be estimated are receive carrier frequency,
receive times,
receive symbol rate,
receive modulation index (in the case of frequency shift keying methods, e.g. in the case of FSK or GMSK),
Doppler frequency (in the case of vibration/movement only),
signal-to-noise ratio,
signal power (RSSI),
channel phase, channel attenuation,
dispersion in the channel (number of multipaths), and
polarization rotation.

The deviations of the estimated receive parameters from the expected receive parameters allow inferences to be made concerning the environment parameters.

The environment parameters can be environment parameters in the vicinity of the data transmitter 130 (e.g. the transmit node), such as e.g. a temperature of the data transmitter or an ambient temperature (e.g. room temperature) of the environment of the data transmitter, or environment parameters of the channel (e.g. the communication channel between the data transmitter 130 and the data receiver 110) or environment parameters of the data receiver 110 (receiver).

The receive parameters generally depend on tolerances of the transmit hardware, interference caused in the channel and/or tolerances of the receive hardware.

In exemplary embodiments, at least one of the environment parameters in the vicinity of the data transmitter 130 can be determined on the basis of a signal parameter of the received signal 120. Exemplary embodiments can be used for both a wireless transmission (e.g. via a radio channel) and a wired transmission.

The estimation of the receive carrier frequency as a signal parameter and the mapping of the estimated receive carrier frequency onto the temperature in the data transmitter 130 (e.g. the transmit node) as an environment parameter is explained by way of example below. In the example, the estimation is carried out in a base station as the data receiver 110. The data transmitter 130 (e.g. the end point) transmits, for example, a data packet via a wireless communication channel (e.g. air). The carrier frequency of the data packet is defined by the HF crystal of the data transmitter 130 (see FIG. 1). A temperature of −12 degrees, for example, distorts the crystal frequency by +10 ppm. In addition to temperature, the carrier frequency also depends on ageing and on component spread. The component spread is a one-off, fixed deviation which occurs in the production of the crystal and the manufacture of the printed circuit board. The component spread can be compensated and eliminated during production. Ageing is a very slow process in which the frequency changes over years. The age-related deviation of the crystal can be assumed to be 0 ppm following calibration. A mean value can initially be formed over a predefined time period, such as e.g. one year, as a reference in order to obtain a reference mean value. A mean value (e.g. a floating mean value) can then be formed over a further predefined time period, such as e.g. one year, in order to estimate ageing. The difference between the reference mean value and the mean value provides the change due to ageing, i.e. the deviation between the initial mean value (reference mean value) and the current mean value can be assumed to be the ageing deviation. The current ageing for each data transmitter 130 (e.g. node) can be stored in the base station 110. The remaining effect then relates only to the current temperature changes which can be described by the temperature curve of the crystal (see FIG. 1). The crystal frequency which, for example, in the ideal case is 20 MHz, then shifts to 20.0002 MHz. The transmit carrier frequency of the data transmitter 130 (e.g. the terminal node) thus shifts from 868 MHz to 868.008680 MHz. The receiver 116 in the base station 110 receives the data packet and estimates the carrier frequency. The estimation is very precise and indicates a deviation of 8.68 kHz. It is assumed here that the base station 110 has very precise clock generators. The base station 110 can, for example, be GPS-synchronized or can have a very precise temperature-compensated crystal, such as a TCXO (Temperature-Compensated Crystal Oscillator) or OCXO (Oven-Controlled Crystal Oscillator) which adds virtually no additional errors. According to FIG. 1, a deviation of 8.68 kHz is possible at a temperature of −12° C. only, whereby the temperature can be unequivocally defined.

The case where the frequency estimation produces, for example, a value of +5 ppm is slightly more complicated. In this case, two possible solutions exist according to FIG. 1, namely −32° and +12° C. A single temperature measurement is not sufficient here. A second measurement, for example, can be carried out. If the second measurement produces, for example, a temperature of +24° C. and a difference compared with the previous estimation of the receive carrier frequency is +7 ppm, the probability that the temperature will be 12° C. is greater.

In exemplary embodiments, at least one receive parameter of the transmission can be estimated and can be mapped by means of a mapping function onto at least one environment parameter or a change in the environment parameter.

In exemplary embodiments, the temperature can be estimated via a carrier frequency estimation.

In exemplary embodiments, the measurement can be calibrated e.g. once only using a temperature sensor in order to determine the current temperature point. The calibration of the temperature sensor offers a further advantage. Different crystals have different temperature curves. The temperature curve may, for example, turn out to be slightly steeper or flatter depending on a cut of the crystal. The exact curve can be determined on the basis of at least two temperature points calibrated with the temperature sensor. Ageing can also be calculated during the calibration. In this case, the mean value at the temperature measured now by the temperature sensor is subtracted from the mean value measured last year at the same temperature of the temperature sensor.

In exemplary embodiments, an initial or recurring calibration which can be used to refine the mapping function can be carried out by way of an existing temperature sensor 137.

In exemplary embodiments, the carrier frequency and, from it, the deviation of the crystal frequency can initially be estimated.

In exemplary embodiments, receive parameters can in turn be mapped into different receive parameters before the latter are mapped into environment parameters.

Similar to the estimation of the frequency error of the frequency generator based on the receive carrier frequency, the frequency error of the timer can also be estimated. For this purpose, the expected time interval can be compared with the estimated time interval between two data packets or sub-data packets. Not only the current value of the temperature, but also the accumulated temperature change are relevant to the temporal deviation. The temporal deviation thus indicates the amount by which the temperature has changed on average from the last measurement (see FIG. 2). The frequency error of the timer can be used for an independent estimation of the environmental influences or in combination with the deviation of the HF crystal.

In exemplary embodiments, the receive parameters can be (receive) times of the data packets/sub-data packets, a carrier frequency, a symbol clock, a modulation error, a receive power or a received signal-to-noise ratio.

In exemplary embodiments, at least one crystal curve (e.g. as in FIG. 1) can be stored in the data receiver 110 (e.g. the base station).

In exemplary embodiments, the temperature values of a temperature sensor can also be transmitted in the payload.

1.2 Defining the Receive Parameters and Mapping them onto Environment Parameters (Other)

In the case of a moving data transmitter 130 (mobile operation), the carrier frequency of the signal 120 changes due to the Doppler shift. The shift in the carrier frequency of the signal 120 depends on the speed at which the data transmitter 130 moves. The speed of the data transmitter 130 relative to the data receiver 110 (e.g. the base station) can thus be estimated on the basis of the estimation of the carrier frequency shift. If the speed of the data transmitter 130 is estimated in relation to a plurality of geographical points (e.g. by a plurality of data receivers 110 (e.g. base stations)), the direction and speed of the data transmitter can also be estimated more precisely.

In exemplary embodiments, a movement can be identified on the basis of a change (shift) in the carrier frequency of the signal 120.

In exemplary embodiments, a vibration or other movements can be inferred on the basis of a frequency profile (estimation of the Doppler shift). The frequency profile relates to a profile of the Doppler shift in the signal. In the case of a vibration, the speed of the transmitter relative to the receiver is constant, resulting in a rapid change in the estimated Doppler frequency. If, for example, the transmitter vibrates at 100 Hz, this results in an increase and decrease in the Doppler shift in the signal 100 times per second.

In exemplary embodiments, the frequency or reference frequency provided by the crystal changes due to the vibration of the crystal (microphonics of the crystal). A vibration can similarly be identified as a result. In contrast to the previous exemplary embodiment, a frequency deviation which is constant with a constant vibration frequency is produced here in the signal. This occurs due to a detuning of the crystal if the latter is subjected to vibrations.

1.3 Inferring the Environment Through the Difference Between Two Receive Parameters In exemplary embodiments, the difference between a receive parameter estimated at a first time (e.g. during a first transmission of the signal 120) and a receive parameter estimated at a second time (e.g. during a second transmission of the signal 120) can be determined instead of defining the difference between the estimated receive parameter (e.g. the receive carrier frequency) and the expected receive parameter (e.g. the receive carrier frequency). A difference in the environment parameter, such as e.g. a temperature increase (e.g. of +3° C.) can be determined on the basis of the difference between the receive parameters.

In exemplary embodiments, a receive parameter can be determined on the basis of the difference between at least two other receive parameters. The receive parameter determined in this way can then be converted into the environment parameter (environmental conditions).

In exemplary embodiments, the receive parameter can be the difference between two estimated receive frequencies.

1.4 Estimating Receive Parameters

Exemplary embodiments of the estimation of signal parameters (receive parameters) are described below.

In exemplary embodiments, the transmitted symbols of the transmission (of the signal 120) can be used to estimate the receive parameter.

In exemplary embodiments, the receive parameter can be estimated on the basis of known symbols which are used in the transmission, e.g. pilot symbols.

In exemplary embodiments, the receive parameter can be estimated on the basis of two groups of symbols of a data packet/partial data packet, wherein the two groups of symbols are spaced apart from one another. A first group of symbols can be disposed, for example, at the start of the data packet/partial data packet, whereas a second group of symbols can be disposed at the end of the data packet/partial data packet.

In exemplary embodiments, the estimation of the receive parameter can be based on at least four symbols, preferably at least 20 symbols, and particularly preferably at least 40 symbols.

In exemplary embodiments, the receive parameter can be estimated on the basis of unknown symbols (of the data packet/partial data packet) (referred to as a blind estimation).

In exemplary embodiments, the symbols on the basis of which the receive parameter is estimated can be immediately adjacent symbols or symbols spaced apart from one another.

In exemplary embodiments, the symbols can form a sub-data packet (partial data packet, radio burst) or a data packet.

In exemplary embodiments, the symbols on the basis of which the receive parameter is estimated can correspond to a pattern known to the data receiver 110, such as e.g. a synchronization sequence.

In exemplary embodiments, the symbols on the basis of which the receive parameter is estimated can be distributed over a plurality of partial data packet/data packets.

1.5 Improving Estimation Accuracy Through More Data (Calibration of the Mapping Curve)

As already mentioned, every crystal has a different temperature curve. The temperature curve of the crystal can be defined more precisely from a possible set of possible curves. Stochastic moments, such as e.g. mean value/variance, can be formed for this purpose. A distribution can also be defined. A mean value can furthermore be formed in order to eliminate the component spread or to define the mean temperature.

Figure 5:
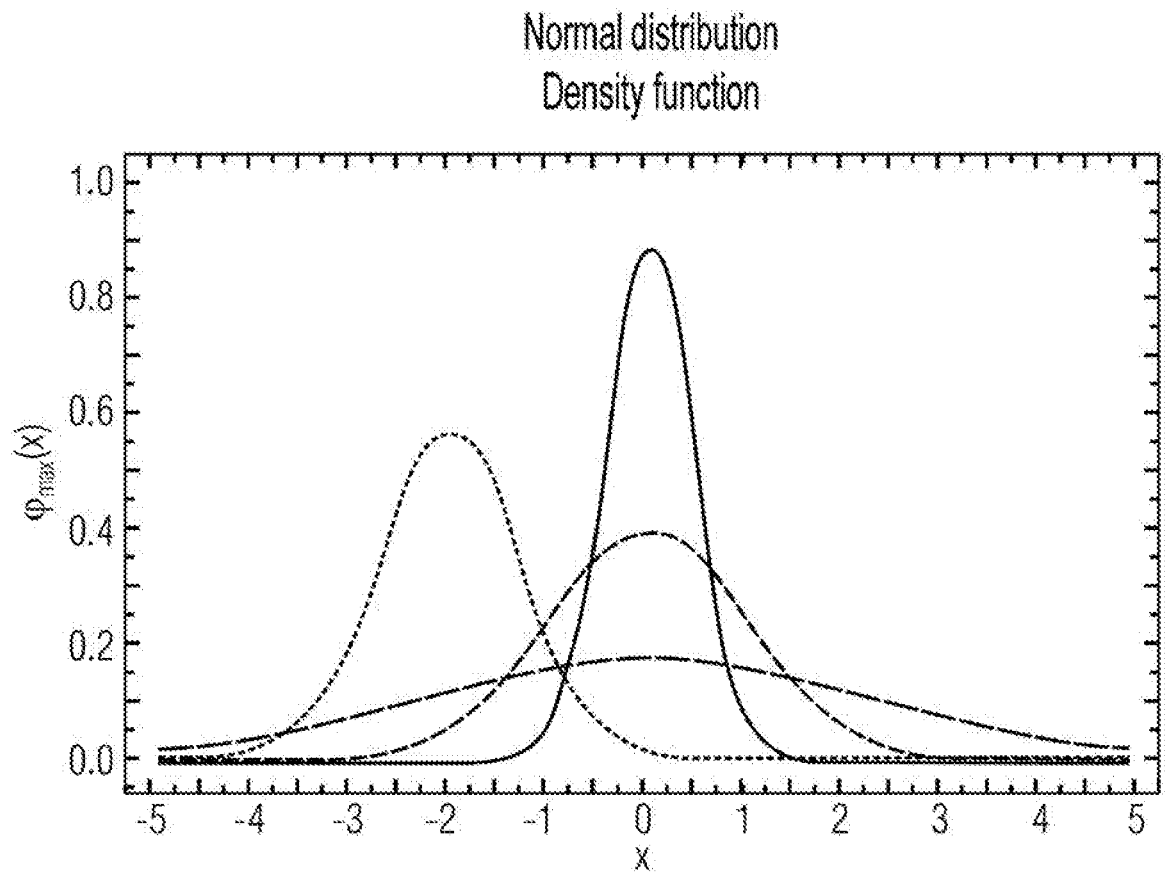
FIG. 5 is a diagram showing density functions of four different normal distributions.

FIG. 5 is a diagram showing density functions of four different normal distributions. The y-axis describes the probability density and the x-axis the value of a random variable.

In exemplary embodiments, an average can be calculated over a plurality of temperature values from the sensor in order to define the mean value and/or the variance of the temperature (see FIG. 5). The mean value and the variance can be used to define the precise temperature curve of the crystal from a quantity (set) of possible temperature curves (crystal error over temperature). The sensor is no longer used thereafter, but only the crystal.

If the temperature has been defined by a temperature sensor, the crystal curve (temperature curve of the crystal) can be defined more precisely. A plurality of points from the curve, at least two, can be calibrated for this purpose. The precise frequency deviation (i.e. discrete points on the crystal curve), for example, can be defined for a certain temperature. The complete curve can then be defined by means of a polynomial approximation which passes through the points (polyfit command in MATLAB). The polynomials do not exceed specific limits which are guaranteed by the crystal manufacturer.

Figure 6:
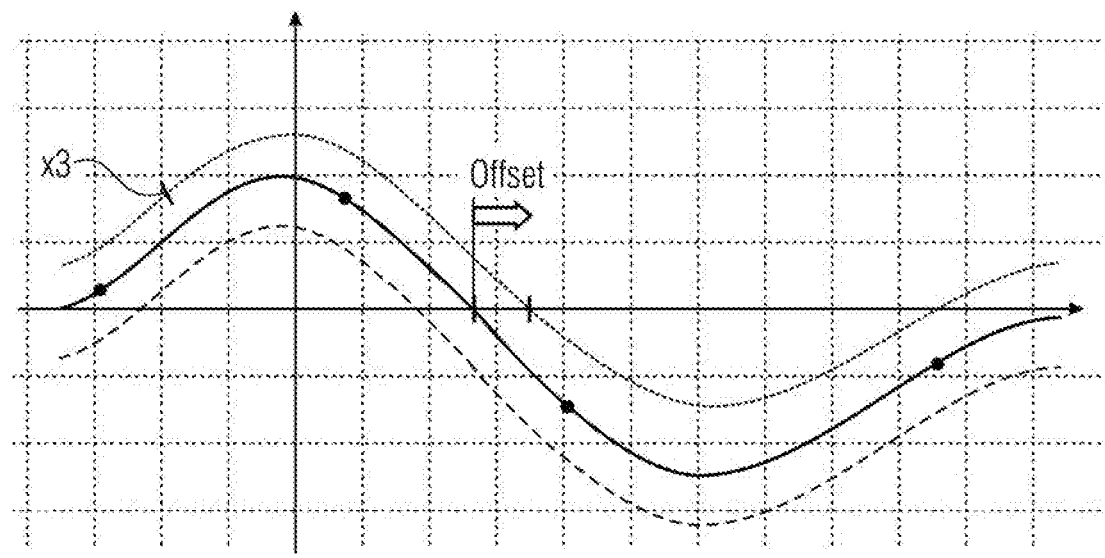
FIG. 6 is a diagram showing a schematic view of the definition on the data receiver side of the crystal curve of the crystal of the data transmitter, according to one exemplary embodiment of the present invention.

FIG. 6 is a diagram showing a schematic view of the definition on the data receiver side of the crystal curve of the crystal of the data transmitter, according to one exemplary embodiment of the present invention. The y-axis describes the frequency deviation in ppm and the x-axis the temperature in ° C.

There are two possibilities for defining the crystal curve.

According to a first possibility, a frequency can be estimated and, in addition, the associated temperature can simultaneously be read from the payload. The temperature has been measured for this purpose e.g. by means of a sensor. The values of the x-axis and the y-axis of a point are thereby known.

If the same procedure is repeated for different temperatures (e.g. day/night), a plurality of points of the crystal curve can be defined. The crystal curve can be described by the function $ax^3+bx^2+cx+d$. The matching coefficients can be defined and the complete curve can be determined through polynomial approximation (e.g. polyfit command in Matlab).

In FIG. 6, the broken-line curve is the defined crystal curve. In production, 1 point was defined during the calibration, namely e.g. x=20° C. y=0 ppm. The difference between the broken-line curve (from polyfit) and the zero point from the production calibration produces the offset in FIG. 6. The offset may have shifted over time e.g. due to ageing.

According to a second possibility, only the frequency is estimated and the associated temperature is not known. Only the y-axis of each point is therefore known, and not the x-axis. If a plurality of points of the curve have been determined, either a squeezed or spread crystal curve can be determined on the basis thereof. Since the possible characteristic of the curve is known (e.g. sinusoidal, as with known frequency), the squeeze/spread can be eliminated and the crystal curve can be roughly defined.

An averaging of the frequency can be used in both cases to define the point of the crystal curve more precisely/with less noise.

In exemplary embodiments, the crystal curve can be defined more precisely by measuring different temperatures (e.g. during the day, during the night, in winter, in summer) (see FIG. 6).

In exemplary embodiments, the error of the timer (LF 32 kHz) can be compensated via the frequency of the carrier frequency generator. This results in a value of X ppm. The carrier frequency generator is usually more precise here than the timer. The deviation of the two frequencies can also be transmitted in the signal 120 (e.g. uplink) and can be used to refine the environment parameter measurement.

In exemplary embodiments, the signal 120 can have information (in the modulated primary information) which describes the amount by which the timer (time crystal, LF crystal) and the frequency generator (frequency crystal, HF crystal) diverge. This information can be used in the data receiver (e.g. base station) to calibrate the crystal curves or to define the environment parameters.

In exemplary embodiments, the corresponding transmit parameters can be generated by at least two different timers (e.g. crystals), for example the carrier frequency of a first signal (e.g. a first data packet) can be generated by a first crystal and the carrier frequency of a second signal (e.g. a second data packet) can be generated by a second crystal. The results of the two crystals can then be combined (e.g. averaged) (on the side of the data receiver). In detail, two (e.g. crystal-stabilized) oscillators can be used on the data transmitter side. It can be known to the base station that the data transmitter has two oscillators and when which oscillator is used. The data transmitter can, for example, alternately transmit signals which are dependent on the first oscillator and on the second oscillator. Since two crystal curves are also stored for the two oscillators, two temperatures can also be determined on the data receiver side on the basis of the received signals and the two crystal curves, wherein the two temperatures can be combined (e.g. through averaging) in order to obtain the final temperature. More than two oscillators can obviously also be used.

If two (or more) signal parameters are estimated which are differently influenced, the absolute values of the influencing factors can be reconstructed from the relative changes in the deviations. If, for example, a linear temperature dependence exists in the case of parameter A, and a quadratic temperature dependence in the case of parameter B, the absolute position on the crystal curve can be inferred by comparing the relative deviations (cf. FIG. 7).

Figure 7:
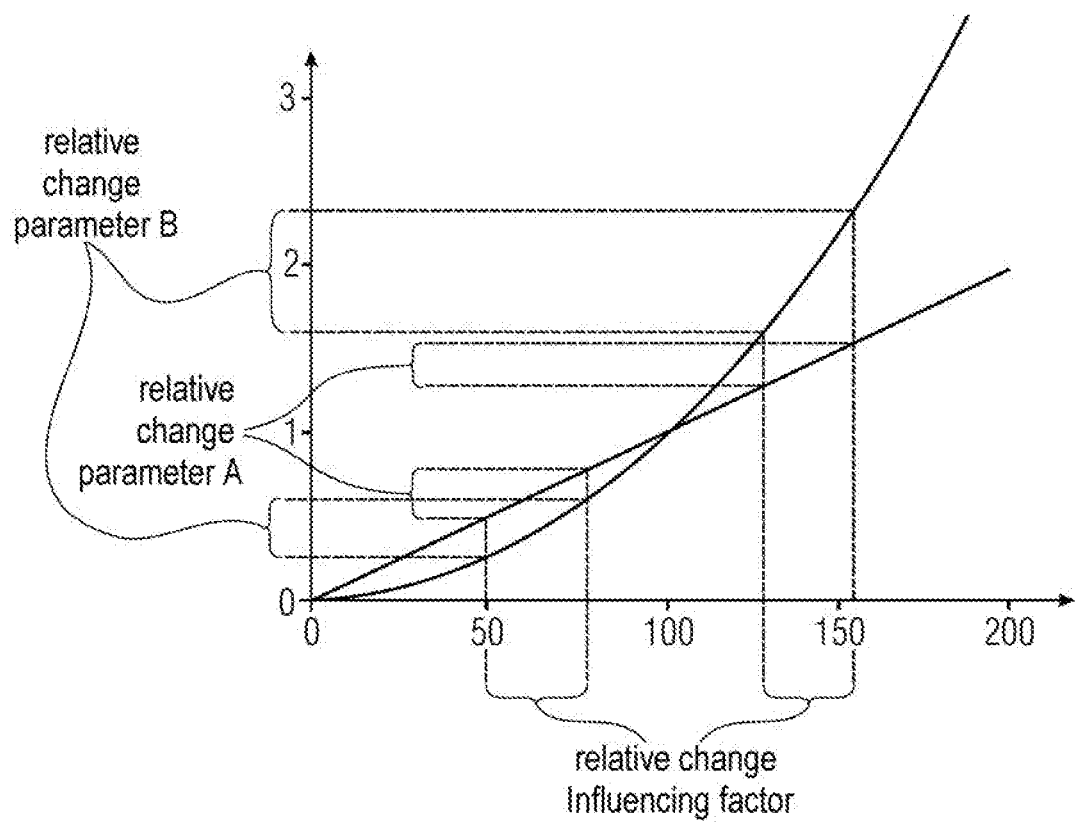
FIG. 7 is a diagram showing dependencies of two different signal parameters on an environment parameter.

In detail, FIG. 7 is a diagram showing dependences of two different signal parameters on one environment parameter. The y-axis describes the value of the signal parameters (e.g. frequency deviation and time deviation), while the x-axis describes the value of an environment parameter (e.g. temperature). In other words, FIG. 7 shows relative deviations for differently influenced parameters. Relative deviations are the differences indicated in the figure between the observed points, wherein the axes directly represent the influencing environment parameter (x-axis) and influenced signal parameters (y-axis).

In exemplary embodiments, estimated values of transmitters which can be differently influenced are combined in order to determine absolute values from relative deviations. If a plurality of transmitters are present in an identical or similar environment (e.g. in the same room) and these transmitters (or their crystals) are differently influenced by temperature changes, a receiver which receives a plurality of these transmitters can infer absolute values (similar to FIG. 7) or can generally increase the estimation accuracy by comparing the determined signal parameters.

2. Defining Environment Parameters of an Area by Combining Receive Parameters In Section 1, it was shown that the environment parameters 124 of the environment of the data transmitter 130 can be estimated from signal parameters (e.g. receive parameters) of a signal 120 from a data transmitter 130.

A plurality of data transmitters are frequently disposed (e.g. installed) in a certain area, possibly with the same environmental conditions. This is the case, for example, in WLAN networks with a plurality of participants or in the IoT (Internet of Things). The positions of the data transmitters are typically known or can be defined.

Inferences can be made from the results of the individual data transmitters regarding distributions of the environmental conditions in the area.

As already mentioned, the following signal parameters (receive parameters), inter alia, can be estimated and can be used for an evaluation of the environmental conditions:
  receive carrier frequency;
  receive times;
  receive symbol rate;
  receive modulation index (in the case of frequency shift keying methods, such as FSK or GMSK); and/or
  Doppler frequency (in the case of vibration/movement only).

Information relating, for example, to the following environment parameters can be determined from the aforementioned signal parameters:
  temperature;
  relative humidity;
  pressure;
  electromagnetic radiation;
  brightness; and/or
  vibration/movement.

Figure 8:
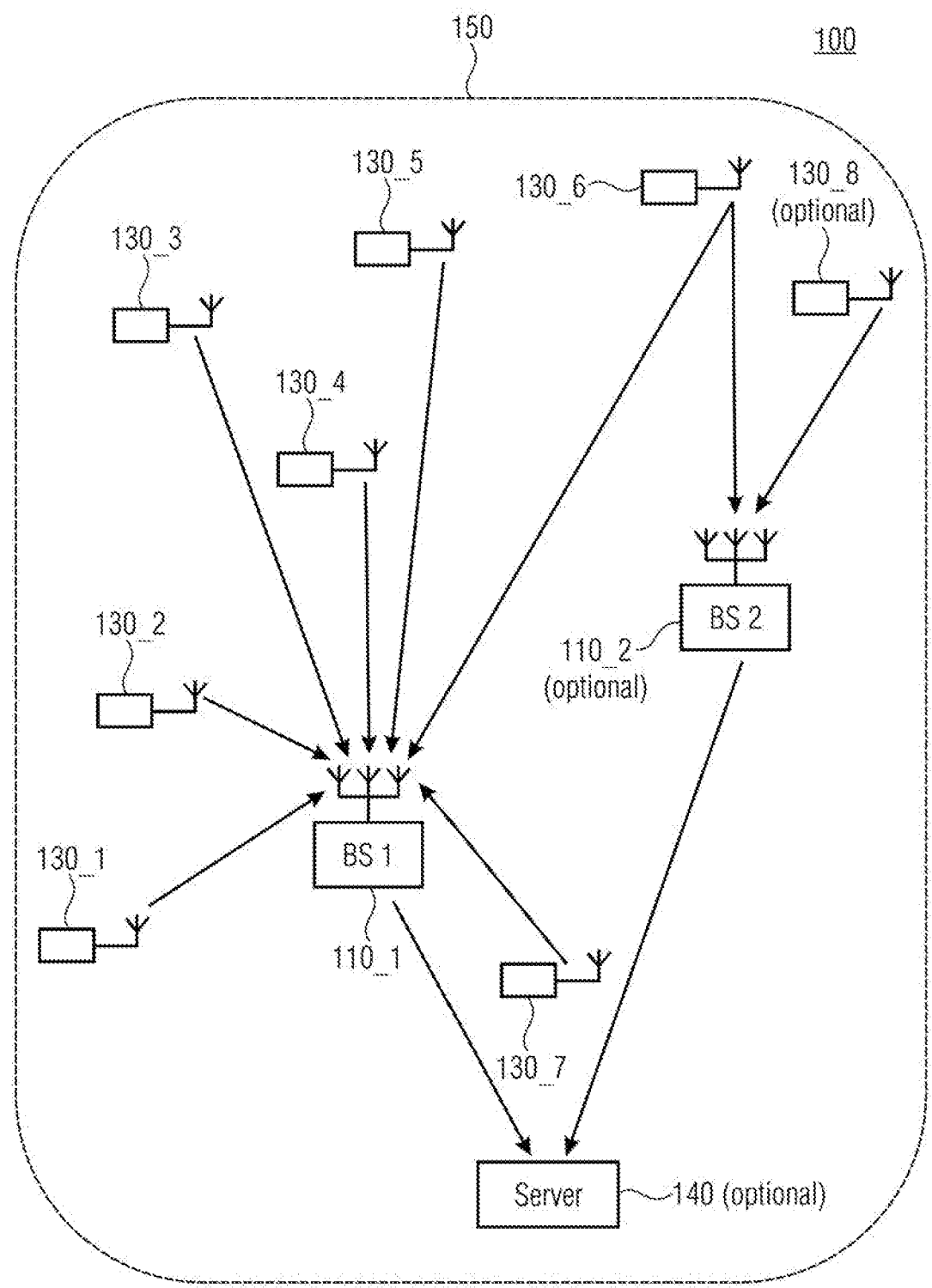
FIG. 8 shows a schematic block diagram of a system with a data receiver and a plurality of data transmitters which are disposed in an area, according to one exemplary embodiment of the present invention.

FIG. 8 shows a schematic block diagram of a system 100 with a data receiver 110_1 and a plurality of data transmitters 130_1-130_n (n=7) which are disposed in an area 150, according to one exemplary embodiment of the present invention.

The system 100 shown in FIG. 8 has, by way of example, n=7 data transmitters 130_1-130_n which are disposed in the area (e.g. a site or building) 150. The system 100 can generally have a plurality of data transmitters 130_1-130_n, where n is a natural number greater than or equal to two, n≥2.

The data receiver 110_1 which may, for example, be a base station, can be disposed inside or outside the area.

The data receiver 110_1 can be designed to receive a plurality of signals from the plurality of data transmitters 130_1-130_n (n=7), wherein the plurality of signals are dependent on clock signals from clock generators of the respective data transmitters 130_1-130_n (n=7) (cf. FIG. 4). The data receiver 110_1 can further be designed to determine (e.g. to evaluate or estimate) signal parameters (e.g. signal characteristics, such as e.g. carrier frequencies or carrier frequency deviations) of the plurality of received signals.

In exemplary embodiments, the data receiver 110_1 can further be designed to determine (e.g. to estimate), on the basis of the determined signal parameters, at least one environment parameter of the area 150 to which the clock generators of the data transmitters 130_1-130_n (n=7) are exposed.

Alternatively, the data receiver 110_1 can also be designed to transmit the determined signal parameters to a central server 140 (e.g. head end) of the system 100, wherein the central server 140 can be designed to determine, on the basis of the signal parameters determined by the data receiver 110_1, the at least one environment parameter of the area 150 to which the clock generators of the data transmitters 130_1-130_n (n=7) are exposed. It is obviously equally possible for the data receiver 110_1 to determine environment parameters of the area 150 on the basis of the determined signal parameters and transmit them to the central server 140 (e.g. head end) of the system 100 for further processing, such as e.g. for determining an environmental condition (e.g. earthquake, storm, rain, traffic congestion) of the area on the basis of the determined environment parameters or on the basis of a distribution of the determined environment parameters.

As shown by way of example in FIG. 8, the system can have a further data receiver 110_2, such as e.g. a further base station, wherein the further data receiver 110_2 can be designed to receive a plurality of signals from a plurality of data transmitters 1306, 130_7 which are disposed in the area, wherein the plurality of signals are dependent on clock signals from clock generators of the respective data transmitters. The further data receiver 110_2 can receive signals from data transmitters (e.g. the data transmitter 130_6 in FIG. 8) which are similarly received by the data receiver 110_1, or signals from data transmitters (e.g. the data transmitter 130_8 in FIG. 8) which are not received by the data receiver 110_1. The further data receiver 110_1 can further be designed to determine signal parameters (e.g. signal characteristics, such as e.g. carrier frequencies or carrier frequency deviations) of the plurality of received signals.

In exemplary embodiments, the further data receiver 110_2 can be designed to determine at least one environment parameter of the area 150 on the basis of the determined signal parameters. The further data receiver 110_2 can obviously also be designed to transmit the determined signal parameters to the central server 140 for further processing.

In exemplary embodiments, the data receiver 110_1 (and/or the further data receiver 110_2 or the central server 140) can be designed to combine the determined signal parameters in order to obtain at least one combined signal parameter, wherein the at least one environment parameter is determined on the basis of the at least one combined signal parameter.

In exemplary embodiments, at least two groups (e.g. proper subsets (e.g. disjoint or overlapping subsets)) of signal parameters can be combined during the combination of the determined signal parameters in order to obtain at least two combined signal parameters for the at least two groups of signal parameters, wherein the at least one environment parameter of the area is determined on the basis of the at least two combined signal parameters.

For example, at least two groups of different signal parameters (e.g. first group: carrier frequencies (or carrier frequency deviations); second group: signal powers) can be combined in order to obtain at least two different combined signal parameters. At least two groups of identical signal parameters (e.g. first group: carrier frequencies (or carrier frequency deviations); second group: carrier frequencies (or carrier frequency deviations)) can obviously also be combined in order to obtain at least two identical combined signal parameters.

An environment parameter of the area 150, for example, can be determined for each of the at least two combined signal parameters in order to obtain at least two environment parameters (e.g. different environment parameters (e.g. temperature, air pressure, relative humidity) or identical environment parameters (e.g. temperatures, air pressures, relative humidities)) of the area 150. The at least two environment parameters (e.g. in the case of identical environment parameters] can optionally be combined in order to obtain a combined environment parameter. A plurality of (different) environment parameters can obviously also be determined (in each case) on the basis of the at least two combined signal parameters.

In exemplary embodiments, all determined signal parameters (e.g. the set of determined signal parameters) or a group of signal parameters (e.g. a (proper) subset of determined signal parameters) can be combined when the determined signal parameters are combined in order to obtain a combined signal parameter, wherein the at least one environment parameter is determined on the basis of the one combined signal parameter.

An environment parameter, for example, or a plurality of (different) environment parameters can be determined on the basis of the one combined signal parameter.

In exemplary embodiments, the signal parameters can be combined on the basis of an averaging, weighting or filtering.

In exemplary embodiments, the data receiver 110_1 (and/or the further data receiver 110_2 or the central server 140) can be designed to determine at least two environment parameters of the area 150 on the basis of the determined signal parameters or combined signal parameters in order to combine the at least two environment parameters in order to obtain one combined environment parameter of the area 150.

One environment parameter can be determined in each case, for example, at least for a subset of the determined signal parameters (e.g. one environment parameter for each determined signal parameter). It is obviously also possible for at least two groups (e.g. proper subsets (e.g. disjoint or overlapping subsets)) of signal parameters to be combined in advance in order to obtain at least two combined signal parameters for the at least two groups of signal parameters, wherein an environment parameter is determined in each case for at least two of the combined signal parameters. More than one environment parameter (e.g. temperature, air pressure, etc.) can also optionally be determined for each signal parameter or for each combined signal parameter.

In exemplary embodiments, the data receiver 110_1 (and/or the further data receiver 110_2 or the central server 140) can be designed to determine a distribution of environment parameters in the area on the basis of the at least two determined environment parameters or combined environment parameters.

In exemplary embodiments, the data receiver 110_1 (and/or the further data receiver 110_2 or the central server 140) can be designed to determine an environmental condition (e.g. earthquake, storm, rain, traffic congestion) of the area 150 on the basis of the determined distribution of environment parameters.

Detailed exemplary embodiments of the present invention are described below.

2.1 Combining a Plurality of Estimated Values into a Total Estimated Value

As already mentioned, an environmental condition can be determined in exemplary embodiments on the basis of a determined distribution of environment parameters.

An earthquake, for example, can be identified, for example, on the basis of a geographical vibration profile and a warning can be issued. A storm warning, for example, can be issued on the basis of a temperature profile.

Parameters also exist which characterize the channel:
signal-to-noise ratio;
signal power (RSSI), channel phase, channel attenuation;
dispersion in the channel (number of multipaths);
polarization rotation;
noise level;
man-made noise;
channel load.

An increased channel attenuation can indicate e.g. rain. An increased noise level (e.g. due to man-made noise) can indicate e.g. traffic congestion.

An attenuation in the channel between any given points (e.g. between a data transmitter and a data receiver) can be determined on the basis of the receive power. This can help to reconstruct the current channel in the entire area and adaptively improve communication over the entire area. The attenuation of the channel can be determined, for example, on the basis of the estimated signal powers and the knowledge of the amount of power with which the data transmitters (e.g. nodes) can transmit and the amount of gain which the antennas have.

A better routing [e.g. of signals or data packets] would therefore be possible. Areas with a current high noise level are avoided. A data transmitter (e.g. a node) can, for example, be receivable by two data receivers (e.g. base stations), wherein a decision can be made (e.g. on the basis of the determined channel attenuation) regarding the base station via which the data transmission takes place.

2.2 Combining the Receive Parameters of a Plurality of Data Transmitters

If a plurality of data transmitters 130_1:130_n (transmitters) are located in a certain area 150 and if the environmental conditions in this area 150 are (essentially) identical (for all transmitters) or at least approximately identical, the estimated environmental conditions or receive parameters can be combined.

This is similarly possible if the data transmitters 130_1:130_n (transmitters) use different wireless protocols. A first data transmitter, for example, can use WLAN and a second data transmitter can use Bluetooth.

In exemplary embodiments, a plurality of receive parameters or environmental conditions from different transmitters can be combined in order to refine the estimation of the environmental conditions (e.g. according to Section 1).

In exemplary embodiments, estimated values (e.g. of signal parameters and/or environment parameters) from internal and external wireless systems or internal and external nodes can be combined. Environment parameters can either be estimated separately and then combined or environment parameters can be estimated on the basis of combined signal parameters.

If a plurality of data transmitters 130_1:130_$n$ (transmitters) are present which are influenced differently (same wireless system or different wireless systems), absolute values can be inferred in the case of different influencing of relative deviations. Alternatively, different influences can be separated, e.g. if the frequency deviation depends on temperature and EM radiation and one of the data transmitters has a TCXO while the other does not (e.g. WLAN device vs IOT node). The temperature-induced components can be distinguished from the radiation-induced components by comparing the deviations. In this respect, the two data transmitters must be exposed to the same environmental conditions.

In exemplary embodiments, estimated values of transmitters which can be differently influenced can be combined to determine absolute values (e.g. of signal parameters and/or environment parameters) from relative deviations (e.g. of signal parameters and/or environment parameters).

In exemplary embodiments, estimated values (e.g. of signal parameters) of transmitters which can be differently influenced can be combined to determine the proportional deviations caused by different environmental influences.

2.3 Defining the Measured Values in the Head End

In systems for defining sensor data at the sensor node, a sensor which defines these data is normally used for defining the sensor values. These sensor data are thus collected directly at the sensor node. The environmental conditions at the transmitter can be inferred using the methods shown in Section 1 on the basis of the signal characteristics at the receiver. If these environmental conditions are precisely the data which are intended to be acquired using the sensor, the definition of the data can be transferred into the base station or into the back end.

The advantage of this is that the sensor node now no longer requires a sensor or said sensor serves only as an additional information source (e.g. for combining a plurality of values). Power consumption is furthermore reduced, since the sensor system no longer has to be supplied with power and the data transmission also contains less information, as a result of which the transmission duration is reduced.

More complex algorithms can also be easily executed at the base station/in the headend, since more processing power is available on the server and the processing power can be increased as required through the use of a plurality of servers. Moreover, the measured values can be further improved by estimating the signal parameters (rx parameters).

An update of the algorithms is therefore also simpler, since only the base stations/headends, rather than all sensor nodes, need to be updated.

In exemplary embodiments, the definition of measured values takes place in the base station or in the headend (not on the data transmitters (e.g. meters)).

2.4 Combining a Plurality of Estimated Values into a Total Estimated Value

In exemplary embodiments, receive parameters can be combined, e.g. through averaging, weighting, weighting with a factor, filtering, or the like.

In exemplary embodiments, statistical parameters (e.g. a mean value) can be formed over a plurality of nodes with identical crystals/batches for defining the mapping function (e.g. temperature curve of the crystal).

In exemplary embodiments, each crystal has a crystal curve which in turn provides information relating to the environment parameters. In exemplary embodiments, crystal curves can be used as information. In exemplary embodiments, the combination of a plurality of crystal curves can be used to obtain a more precise estimation of the environment parameters.

In exemplary embodiments, estimated values (e.g. of signal parameters and/or environment parameters) from a plurality of base stations can be combined. A combination can be carried out, for example, either before or after the mapping of signal parameters onto environment parameters.

In exemplary embodiments, at least two parameters such as time, frequency or symbol clock can be combined after their mapping functions in order to improve the estimation of the environment parameters.

An example of a combination of a plurality of estimated values into a total estimated value is described below.

A data transmitter (e.g. a node) can, for example, have a temperature sensor (cf. FIG. 4). The data transmitter (e.g. node) transmits the temperature data acquired with the temperature sensor in the modulated primary information of the signal or, in other words, in the payload of a data packet, wherein the data packet is received by two base stations 110_1, 110_2. The two base stations 110_1, 110_2 can in each case additionally estimate the temperature via the receive carrier frequency deviation and the expected time interval. Three estimated values are thus produced for each base station. All estimated values can be transmitted from each base station 110_1, 110_2 to a headend server 140. A plurality of values are optionally available to the server 140 at earlier times of the system. The server 140 can start a temperature-defining method by combining the different estimated values. These include, for example, means for reducing the influence of the base stations.

The crystal temperature curve can be defined more precisely. Crystals from the same manufacturer show similar parameters. In the ideal case, crystals from the same batch of the production line are used. The mean value of the component spread is therefore identical over a plurality of nodes from the same crystal manufacturer. Common parameters can be defined significantly more precisely on the basis of the statistical data relating to significantly more nodes. The algorithm on the server finally defines the temperature of the node. If the server knows the location of the transmitter (e.g. GPS coordinates), the server can map the determined temperature onto the location.

As described in the example above, the temperature can be defined for external systems also. A specific temperature can also be assigned here to a location.

2.5 Using More Precise Temperature Measurement for Different Environment Parameters In exemplary embodiments, one specific environment parameter can be used to improve the precision of the definition of another parameter (parameter cross-correlation).

A water volume/water flow, for example, can be measured in a metering system. The temperature of the meter has an impact on the measurement. The even more precise temperature measurement can be used to define the water volume/water flow even more precisely.

2.6 Geographical Arrangement

The environment parameters are typically dependent on their geographical location (locality), i.e. different environmental conditions prevail at different locations. The spatial distribution can be used to identify e.g. an earthquake, storm and/or other environmental influences.

In exemplary embodiments, catastrophes can be identified on the basis of geographical environment parameters.

The channel can be characterized by the channel parameters such as attenuation, polarization rotation, man-made noise, channel load and further parameters.

In exemplary embodiments, the channel state (between each transmitter and receiver) can be defined from a plurality of spatial parameters.

In exemplary embodiments, the determined channel state can be used to optimize the transmission between the node and the base station (e.g. different data rates/modulations/waveforms).

If the channel state between one transmitter and a plurality of base stations is known, routing can be implemented. A node, for example, can be assigned (dynamically) to the base station with the best channel characteristics according to the channel state.

In exemplary embodiments, the determined channel state can be used to optimize the routing of packets. The base station with the best channel characteristics is responsible for the node.

The case may typically occur where specific nodes are not accessible. In this case, persons can drive by automobile nearby in order to read out the nodes which are difficult to access (e.g. behind a metal door). The route can be optimized through knowledge of the channel. The automobile drives through the streets with better reception rather than streets with poorer reception.

In exemplary embodiments, the determined channel state can be used to dispatch persons for a mobile readout to important nodes which have not been accessed. It is simultaneously known whether there are any storm risks, etc., in the area.

The known radio channel provides information relating to other/better paths between the base station and the nodes. The paths can be selected in a targeted manner by modifying the directional effects of the transmit/receive antennas.

In exemplary embodiments, the determined channel state can be used to optimize the main beam directions of the antennas for the base station locations.

Figure 9A:
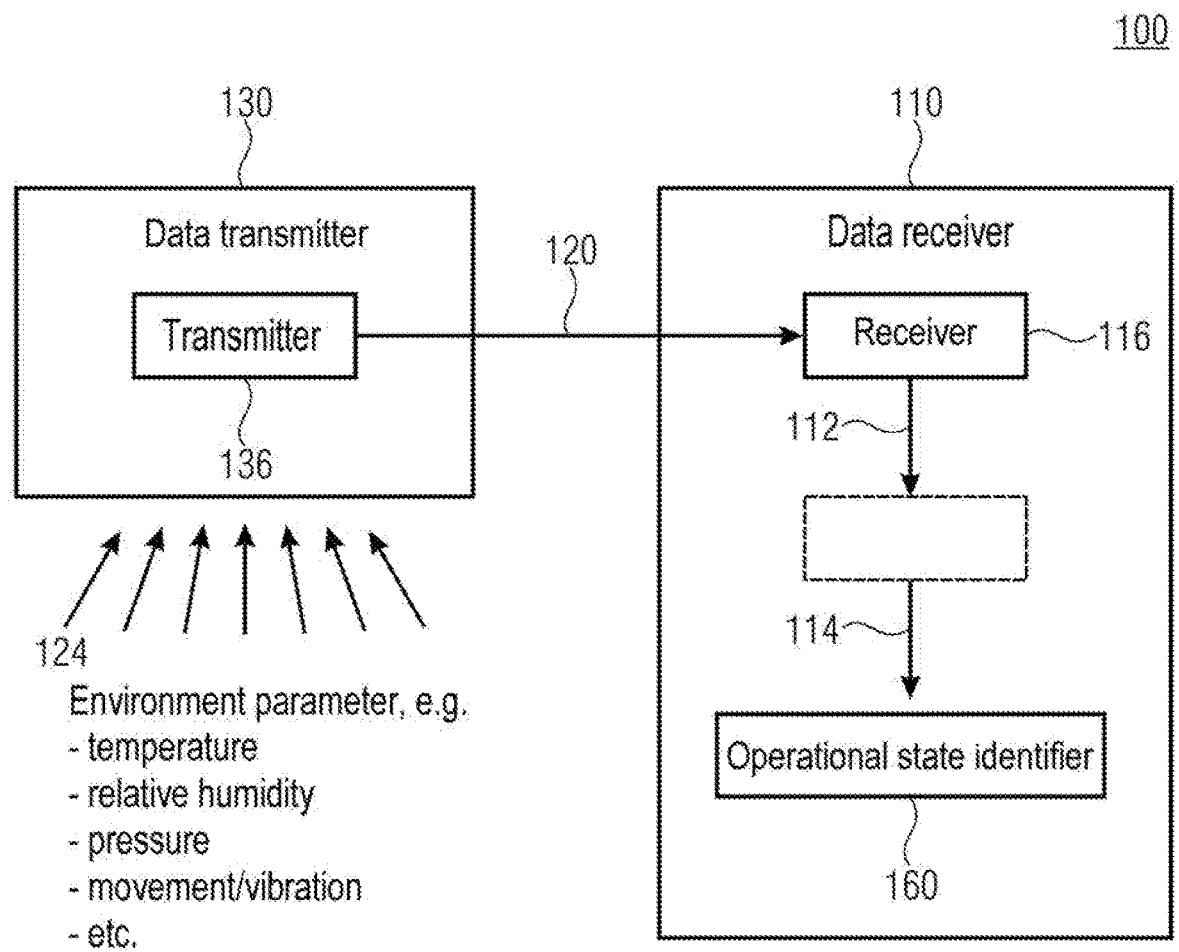
FIG. 9A shows a schematic block diagram of a system with a data receiver and a data transmitter, according to one exemplary embodiment of the present invention.

3. Identifying Faults in the Installation or in Operation by Monitoring the Environment Parameters FIG. 9A shows a schematic block diagram of a system 100 with a data receiver 110 and a data transmitter 130, according to one exemplary embodiment of the present invention.

The data transmitter 130 is configured to transmit at least one signal 120 (e.g. one signal or a plurality of signals, e.g. at certain intervals).

The data receiver 110 (or e.g. a receiver 116 of the data receiver 110) is configured to receive the at least one signal 120 of the data transmitter 130 in order to obtain at least one environment parameter (e.g. one environment parameter or a plurality of environment parameters; e.g. one temperature or a plurality of temperatures) of the data transmitter 130 or of an environment of the data transmitter 130.

The data receiver 110 (or e.g. an operational state identifier 160 of the data receiver 110) is configured to identify an operational state (e.g. a fault-free or a defective operational state) of the data transmitter 130 or of a component (e.g. a battery) of the data transmitter 130 on the basis of a comparison between the at least one obtained environment parameter 114 or an environment parameter profile determined on the basis of the at least one obtained environment parameter 114 (e.g. determined temperature profile), and an environment parameter reference profile which describes an expected environment parameter or an expected environment parameter profile (e.g. expected temperature profile) (e.g. over a time period) in the environment of the data transmitter 130.

Figure 9B:
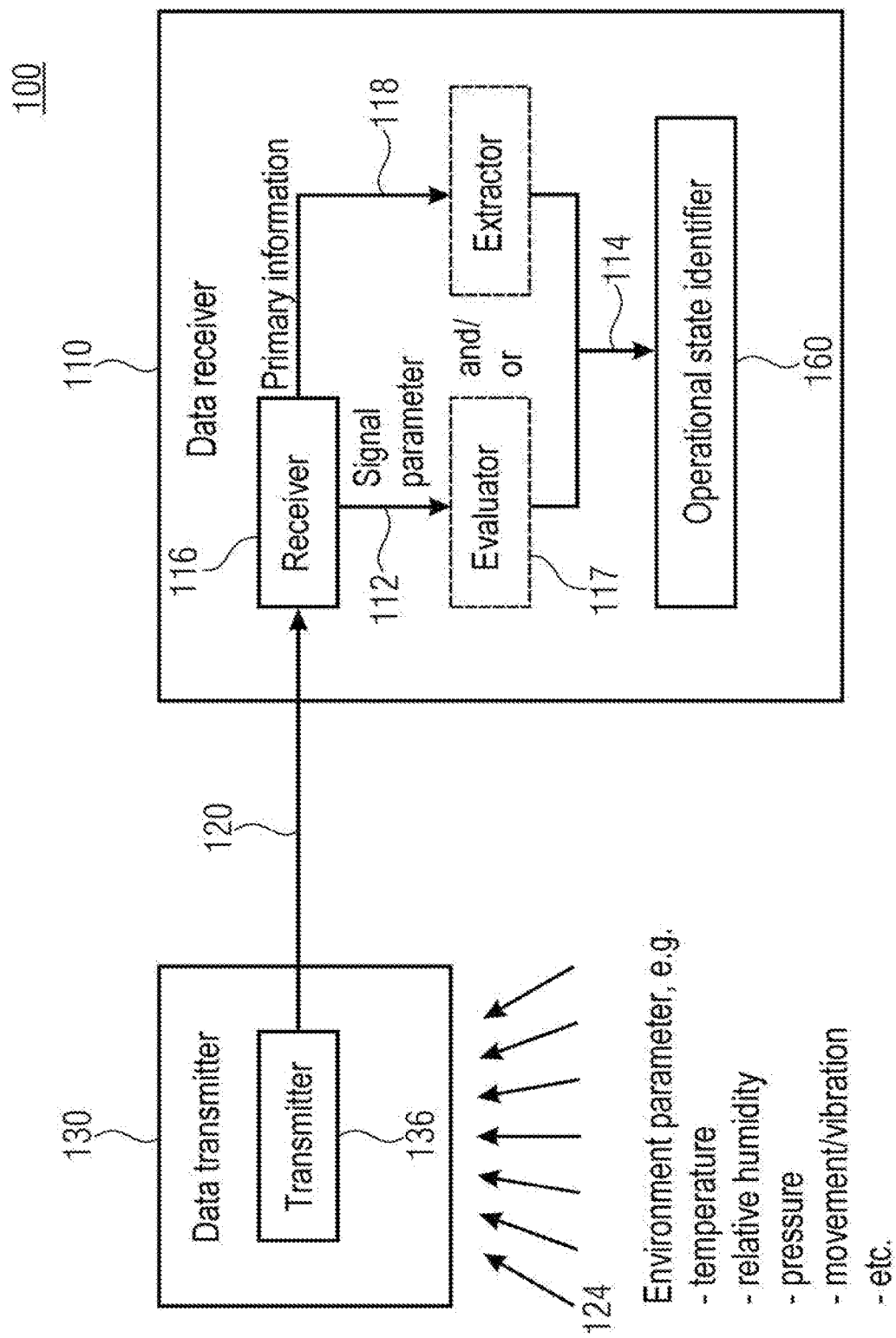
FIG. 9B shows a schematic block diagram of a system with a data receiver and a data transmitter, according to one exemplary embodiment of the present invention.

FIG. 9B shows a schematic block diagram of the system 100 with the data receiver 110 and the data transmitter 130, according to a further exemplary embodiment of the present invention.

As is evident from FIG. 9B, according to one exemplary embodiment, the at least one signal 120 can have information relating to the respective environment parameter 124, such as e.g. a respective sensor value 139, in modulated primary information 118 (see also FIG. 4). In this case, the data receiver 110 (e.g. an extractor 119 of the data receiver 110) can be configured to extract the information relating to the respective environment parameter from the modulated primary information 118 of the respective signal 120 (e.g. through demodulation and decoding) in order to obtain the at least one environment parameter 114.

A plurality of signals 120, for example, can be transmitted by the data transmitter 130 over time at certain time intervals, i.e. a first signal at a first time, a second signal at a second time, etc., wherein each of the plurality of signals can have information relating to one environment parameter (e.g. temperature) or a plurality of environment parameters (e.g. temperature and pressure). The data receiver 110 can be configured accordingly to extract the information relating to the respective environment parameter from the modulated primary information 118 of the respective signal 120 in order to obtain the respective environment parameter 114.

As is evident from FIG. 9B, according to a further exemplary embodiment, the data receiver 110 (e.g. an evaluator 117 of the data receiver 110) can alternatively also be designed to determine (e.g. to estimate) the respective environment parameter on the basis of a signal parameter 112 of the respective signal 120, as explained in detail in Section 1, in order to obtain the respective environment parameter 114.

A plurality of signals 120, for example, can be transmitted by the data transmitter over time at certain time intervals, i.e. a first signal at a first time, a second signal at a second time, etc., wherein the data receiver 110 can be configured to determine at least one signal parameter for the respective signal in order to determine at least one environment parameter for the respective signal on the basis of the at least one signal parameter.

As already mentioned, the data receiver 110 can be configured to identify an operational state (e.g. a fault-free or a defective operational state) of the data transmitter 130 or of a component (e.g. a battery) of the data transmitter 130 on the basis of a comparison between the at least one obtained environment parameter 114 or an environment parameter profile determined on the basis of the at least one obtained environment parameter 114 (e.g. determined temperature profile), and an environment parameter reference profile which describes an expected environment parameter or an expected environment parameter profile (e.g. expected temperature profile) (e.g. over a time period) in the environment of the data transmitter 130.

The environment parameter reference profile can describe, for example, an expected environment parameter in the environment of the data transmitter 130. This occurs, for example, if the data transmitter 130 (e.g. the sensor node) is used in an environment with defined environmental conditions, such as e.g. in a cold-storage room or in an airconditioned datacentre. In this case, an excessive deviation (e.g. a deviation which is greater than or equal to a predefined threshold value) between the obtained environment parameter and the expected environment parameter can indicate a defective operational state of the data transmitter 130 or of a component of the data transmitter 130.

Alternatively, the environment parameter reference profile can describe, for example, an expected environment parameter in the environment of the data transmitter 130. This occurs, for example, if the data transmitter 130 (e.g. the sensor node) is used in an environment with variable environmental conditions, such as e.g. on a roof of a building with environment parameters dependent on times of the day and times of the year. In this case, an excessive deviation (e.g. a deviation which is greater than or equal to a predefined threshold value) between the environment parameter profile determined on the basis of the at least one obtained environment parameter 114 (and e.g. one or more previously obtained environment parameters) and the expected environment parameter profile can indicate a defective operational state of the data transmitter 130 or of a component of the data transmitter 130.

Figure 10:
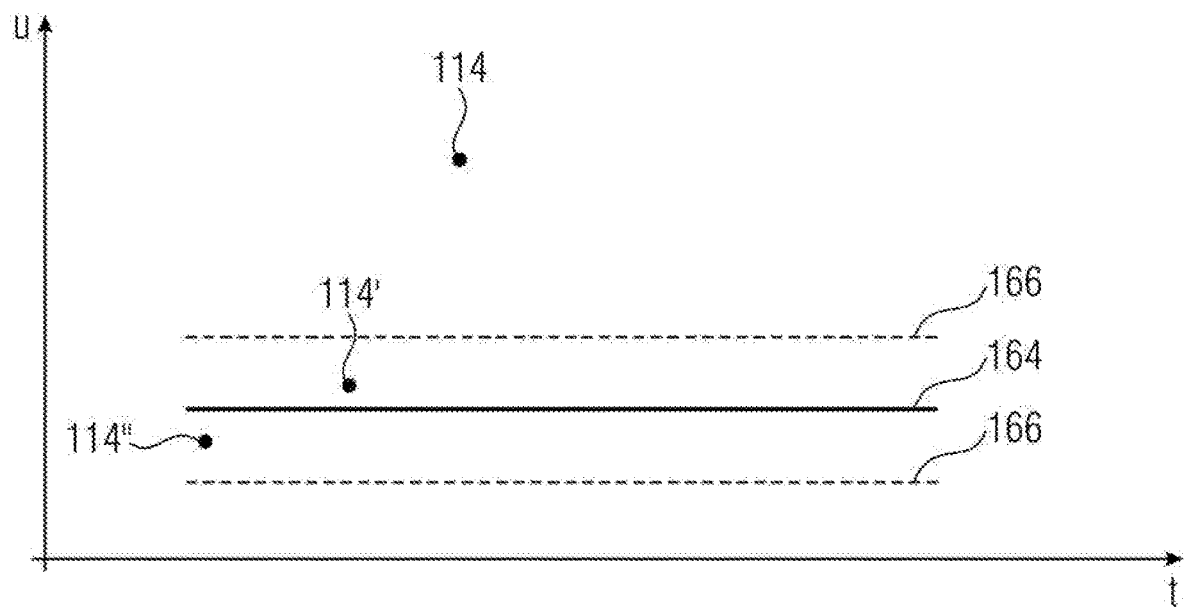
FIG. 10 is a diagram showing an obtained environment parameter compared with an expected environment parameter, according to one exemplary embodiment of the present invention.

FIG. 10 is a diagram showing an obtained environment parameter 114 compared with an expected environment parameter 164, e.g. if the data transmitter 130 (e.g. the sensor node) is used in an environment with defined environmental conditions. The y-axis describes the environment parameter and the x-axis describes time. As is evident from FIG. 10, a deviation between the obtained environment parameter 114 is greater than a predefined threshold value 166, which may indicate a defective operational state of the data transmitter 130 or of a component of the data transmitter 130. Conversely, deviations between previously obtained environment parameters 114' and 114" are less than the predefined threshold value 166, which may indicate a previous defective operational state of the data transmitter 130.

Figure 11:
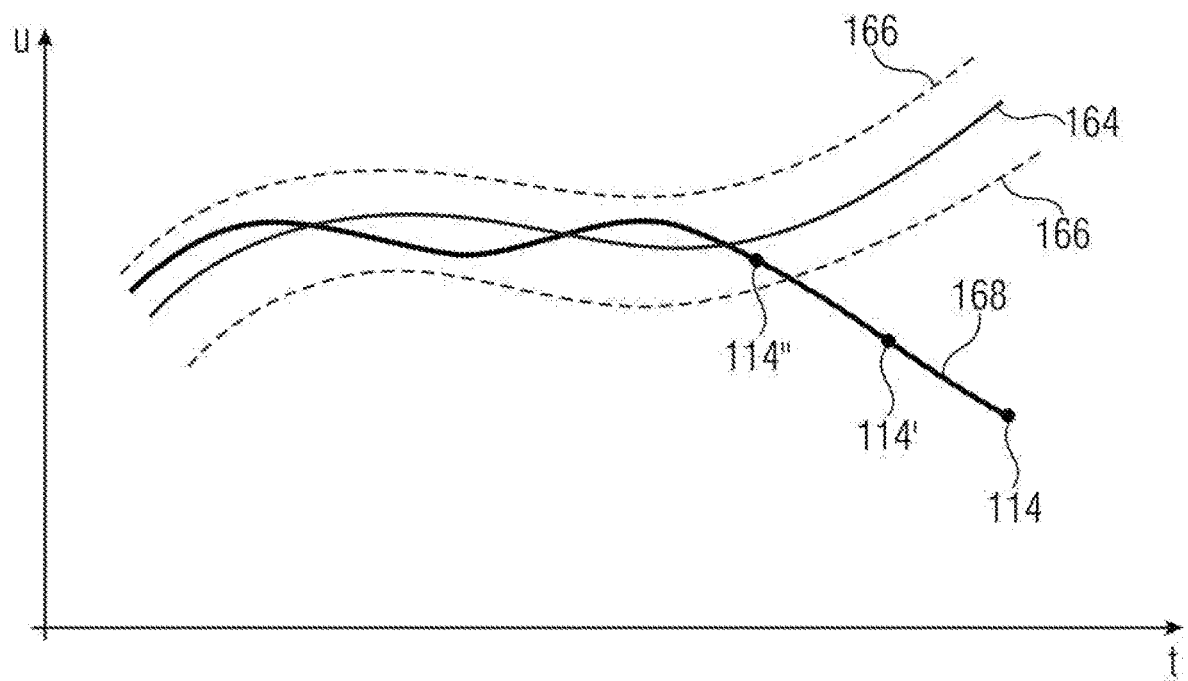
FIG. 11 is a diagram showing an environment parameter profile determined on the basis of the at least one obtained environment parameter and a plurality of previously obtained environment parameters and an expected environment parameter profile, according to one exemplary embodiment of the present invention.

FIG. 11 is a diagram showing an environment parameter profile 168 determined on the basis of the at least one obtained environment parameter 114 and a plurality of previously obtained environment parameters 114' and 144" and an expected environment parameter profile, e.g. if the data transmitter 130 (e.g. the sensor node) is used in an environment with variable environmental conditions. The y-axis describes the environment parameter and the x-axis describes time. As is evident from FIG. 11, a deviation between the determined environment parameter 168 is greater than a predefined threshold value 166, which may indicate a defective operational state of the data transmitter 130 or of a component of the data transmitter 130.

In exemplary embodiments, the data receiver 110 shown in FIG. 9B can also be designed to combine the environment parameter extracted from the modulated primary information 118 and the environment parameter determined on the basis of the signal parameter 117 [e.g. through averaging or weighted averaging] in order to obtain at least one combined environment parameter, wherein the data receiver can be configured to identify an operational state of the data transmitter 130 or of a component of the data transmitter 130 on the basis of a comparison between the at least one combined environment parameter or an environment parameter profile determined on the basis of the at least one combined environment parameter, and the environment parameter reference profile 164 which describes the expected environment parameter or the expected environment parameter profile in the environment of the data transmitter 130.

Figure 12:
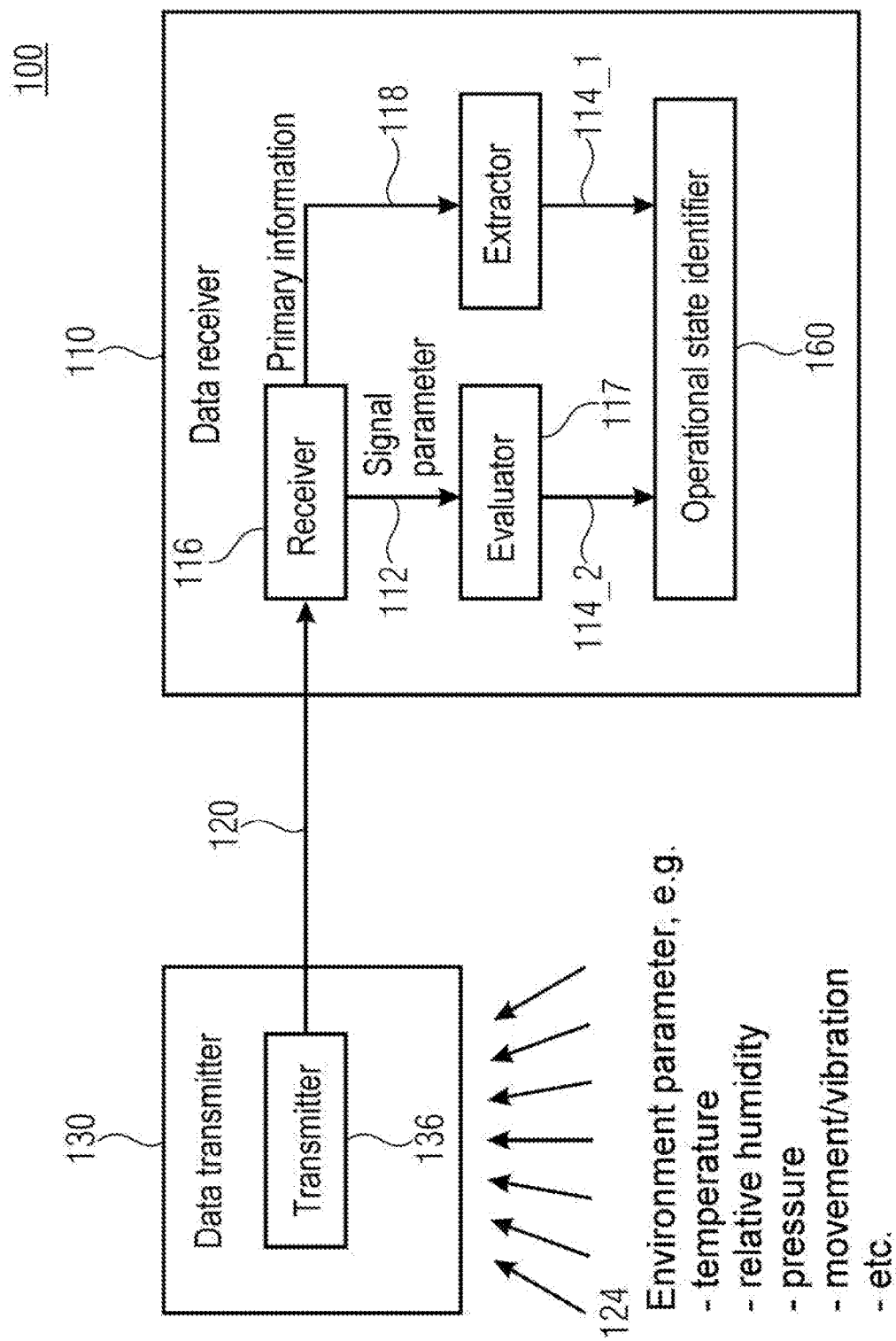
FIG. 12 shows a schematic block diagram of the system 100 with the data receiver 110 and the data transmitter 130, according to a further exemplary embodiment of the present invention.

FIG. 12 shows a schematic block diagram of the system 100 with the data receiver 110 and the data transmitter 130, according to a further exemplary embodiment of the present invention.

In the exemplary embodiment shown in FIG. 12, the data receiver 110 can be configured to receive at least one signal 120 of the data transmitter 130, wherein the at least one signal 120 in each case has an environment parameter measured by the data transmitter 130 in modulated primary information, wherein the data receiver 110 can be configured to extract the respective measured environment parameter from the respective modulated primary information in order to obtain at least one measured environment parameter 114_1.

The data receiver 110 can further be configured in each case to determine a signal parameter 112 of the at least one signal which is dependent on a clock signal 132 of a clock generator 134 of the data transmitter 130 (see FIG. 4) and to estimate, on the basis of the respective signal parameter 112, a respective environment parameter to which the clock generator 134 of the data transmitter 130 or the respective signal 120 is exposed, in order to obtain at least one estimated environment parameter 114_2.

The data receiver 110 can further be configured to identify an operational state of the data transmitter 130 or of a component of the data transmitter 130 on the basis of a comparison between the at least one measured environment parameter 114_1 and the at least one estimated environment parameter 114_2.

An excessive deviation between the measured environment parameter 114_1 and the estimated environment parameter 140_2 can indicate, for example, a defect in the data transmitter 130 or in a component of the data transmitter 130.

Detailed exemplary embodiments of the data receiver 110 shown in FIG. 9a and FIG. 9b are described in detail below. However, the following description is equally applicable to the data receiver 110 shown in FIG. 12.

It was shown in Section 1 that environment parameters can be estimated from receive parameters. It was shown in Section 2 that the definition of the sensor data can also be transferred into the base station/headend server instead of the direct measurement in the sensor node.

Specific profiles, values or patterns of environment parameters can indicate faults in the sensor node. Different faults can thus be identified:
 defective hardware (e.g. defective amplifier, defective sensor, etc.),
 node error, installed at the wrong location,
 firmware error, incorrect version,
 Firmware defect,
 important parameter, nodes, and/or
 manipulation detection (e.g. different HW installed/crystal).

This information can in turn be used to identify and exchange defective hardware (e.g. data transmitters or components of the data transmitters).

In bidirectional systems, it is possible to switch over to different modems or to modify the configuration (for example the data rate can be adjusted or the modulation method can be changed). New firmware could also be loaded in order to eliminate the fault.

The parameters (signal parameters) which are used for this purpose, are e.g.
 receive carrier frequency,
 receive times,
 receive symbol rate;

receive modulation index (in the case of frequency shift keying methods, e.g., FSK or GMSK); and/or Doppler frequency (in the case of vibration/movement only).

Information relating to the environment parameters can be determined from the parameters (signal parameters):
- temperature,
- relative humidity,
- pressure,
- electromagnetic radiation,
- brightness, and/or
- vibration/movement.

A constantly increased temperature, for example, can indicate a defective sensor or flowing currents which heat everything up. An incorrectly configured interface (port) set to "active high" rather than "active low" can, for example, cause a constantly flowing current. This could be identified in exemplary embodiments.

By tracking the temperature, it can also be guaranteed that the hardware is operated only within specific permissible temperature ranges. This is also important if specific components fail, in order to prove that the components have not been operated outside a defined temperature range (exemption from liability).

A cumulative temperature profile over a plurality of years can also be used to estimate the remaining (battery) service life. This applies to other components also, in addition to the battery.

Parameters also exist which characterize the channel, such as e.g.
- signal-to-noise ratio,
- signal power (RSSI), channel phase, channel attenuation,
- dispersion in the channel (number of multipaths),
- polarization rotation,
- noise level,
- man-made noise, and/or
- channel load.

These parameters can also be used to identify faults. A weaker power than expected or repeatedly failing reception can indicate a defective amplifier. A comparison between (obtained environment parameters from) two nodes in close proximity is also possible in order to establish that one of the two nodes is defective.

3.1 Identifying Faults

In some exemplary embodiments, the data transmitter 130 (e.g. the node) has a temperature sensor. The data transmitter transmits the temperature data in the payload, e.g. in a data packet. The data packet is received by one or more data receivers 110 (e.g. base stations). The data receivers 110 in each case additionally estimate the temperature via the receive carrier frequency deviation and the expected time interval according to Section 1. Three estimation values for the temperature are thus obtained for each data receiver 110.

The information relating to the time interval is more meaningful, since it corresponds to the accumulated temperature profile (i.e. the mean value between the two time points). In order to obtain information of this type with a sensor, the sensor would always have to remain activated, which is not practicable. The base station/headend can determine the temperature profile in the data transmitter 130 according to Section 2.

Typical temperature profiles are known to the data receiver/headend and are stored. The expected profiles can be measured (e.g. once only) (e.g. in the laboratory) for the firmware and hardware combination under specific ambient temperature conditions (e.g. in winter, December, at night, during the day, and in summer, July, also time-dependent), and can then be stored.

The temperature profiles of the data transmitters 130 (e.g. sensor nodes) are permitted to occur only within specific limits. Other values exceed the threshold(s) and are identified as incorrect.

In exemplary embodiments, node faults can be inferred from changes in the environment variables over time. Reference profiles (e.g. which were previously recorded) are provided for this purpose and are used in the evaluation.

In addition to the faults, expectation values for the node can also be formed from the measured temperature profiles. One example of this is the battery service life. Another example is temperature-dependent ageing of the hardware or crystals.

In exemplary embodiments, a service life of components can be inferred from the profile of environment variables.

In exemplary embodiments, the accumulated temperature and therefore the accumulated battery load can be defined by means of the accumulated temperature profile (e.g. by the time crystal) and the remaining service life of the battery can be estimated therefrom.

In exemplary embodiments, a fault can be inferred from the difference between at least two nodes which are disposed adjacent to one another, if the deviation between the two nodes exceeds a certain difference.

In exemplary embodiments, relative profiles are also possible. Defective nodes which produce outliers can thus be identified without the knowledge from Section 1 and Section 2 (crystal curves).

3.2 Combining Profiles of a Plurality of Parameters

In exemplary embodiments, profiles of a plurality of parameters can be combined. A temperature profile and a power profile, for example, can be combined in order to identify whether a fault is present in the power amplifier.

In exemplary embodiments, the profiles of a plurality of parameters can be combined in order to infer a fault therefrom.

If faults are identified, it is furthermore possible to wait and see whether the fault is confirmed via at least a second signal (e.g. packet, burst) or with the use of a further data receiver 110 in order to reduce misidentification. This is optionally also possible with the same data receiver 110 if the data transmitter 130 performs multiple transmissions.

In exemplary embodiments, a plurality of transmissions can be combined to ensure fault identification.

3.3 Finer Frequency Shifts

The different components on the hardware of the node are at different distances from the temperature sensor or from the crystal. This results in different temperature coupling coefficients and different delays in the temperature profiles.

The frequency profile within a data packet can be tracked by repeatedly performing a frequency estimation over a small number of bits.

Temperature changes within the data packet can be inferred from frequency changes within the data packet. However, it must be ensured that these changes are not caused by a movement of the data transmitter 130 (e.g. the node) or the data receiver 110 (e.g. the base station) (stationary scenario).

Such fine temperature changes indicate when a control unit (e.g. a microcontroller or processor) of the data transmitter was started, when the oscillator and the power amplifier were activated, etc. This can in turn help to identify or isolate the specific fault.

For this purpose, temperature profiles are measured for a very short time and are stored in the data receiver (e.g. the base station) or in a central server (e.g. a headend server). The fault syndromes can be defined from the temperature profiles.

In exemplary embodiments, the frequency profile can be defined along a data packet/sub-data packet (e.g. in the case of telegram splitting [7]) and the temperature profile can be defined therefrom. Faults can be inferred from this profile with the aid of reference profiles.

In exemplary embodiments, the specific defective component can be identified from the temperature profile within a data packet.

In exemplary embodiments, delays in the temperature profiles can be taken into account.

3.4 Identifying Components of the Data Transmitter (e.g. Endpoint)

The radio chips (of data transmitters) have PLL loops (PLL=phase-locked loop) in order to generate the carrier frequency from the crystal frequency. Different radio chips have different PLL loops. Different PLL loops have different PLL increments. If the data transmitter (e.g. endpoint) performs a channel changeover, the frequency error can be calculated (on the data receiver side) for the expected channel offset and the increment can also be calculated therefrom. The radio chip is then known through the increment.

In exemplary embodiments, the required channel can be defined in order to calculate the frequency difference, taking into account the desired channel. To do this, the frequency can be divided by the channel bandwidth with the modulo operation. The channel spacing must be greater here than the crystal error.

Similarly, the time increment of the timer can also be defined in the time domain and the installed hardware on the data transmitter (e.g. the node) can be defined therefrom.

In exemplary embodiments, the time can also be modulo-calculated (e.g. on symbol duration or sub-data packet duration or telegram duration, timer resolution) in order to calculate the time difference, taking into account a time error caused by the transmit chip. The remainder of the division gives the desired time error.

In exemplary embodiments, the precise crystal type can be defined from the statistics of the crystal.

In exemplary embodiments, the data transmitter can also communicate its composition (i.e. the installed components) in a data packet. The identification can be used in this case for a cross-check.

3.5 Identifying Incorrect Installations or Manipulations

With the knowledge of the exact radio chip or the exact crystal, a check can be carried out to determine whether the correct data transmitter (e.g. node) is installed at the correct location. A check can additionally be carried out, e.g. via the GPS coordinates, to determine whether the correct data transmitter (e.g. node) has been installed with the correct hardware at the correct location.

In exemplary embodiments, incorrect installations can be identified on the basis of the determined hardware configuration.

In exemplary embodiments, if the hardware has changed unexpectedly, it can either be confirmed that the correct data transmitter has been exchanged, or a manipulation of the data transmitter can be identified.

4. Further Exemplary Embodiments

Figure 13:
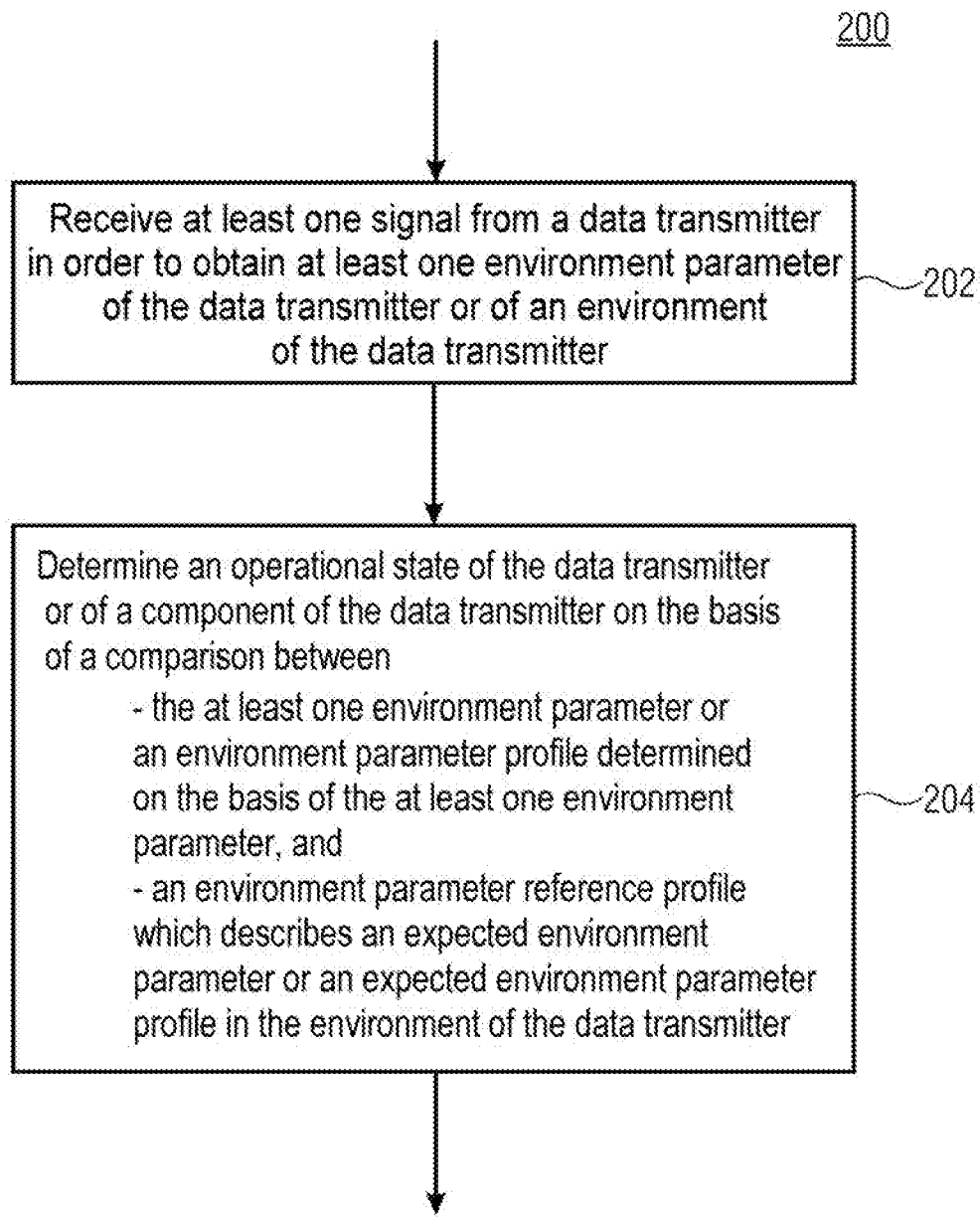
FIG. 13 shows a flow diagram of a method for determining an operational state of a data transmitter or of a component of the data transmitter, according to one exemplary embodiment of the present invention.

FIG. 13 shows a flow diagram of a method 200 for determining an operational state of a data transmitter or of a component of the data transmitter, according to one exemplary embodiment of the present invention. The method 200 comprises a step 202 of receiving at least one signal from a data transmitter in order to obtain at least one environment parameter of the data transmitter or of an environment of the data transmitter. The method 200 further comprises a step 204 of determining an operational state of the data transmitter or of a component of the data transmitter on the basis of a comparison between the at least one environment parameter or an environment parameter profile determined on the basis of the at least one environment parameter, and an environment parameter reference profile which describes an expected environment parameter or an expected environment parameter profile in the environment of the data transmitter.

Figure 14:
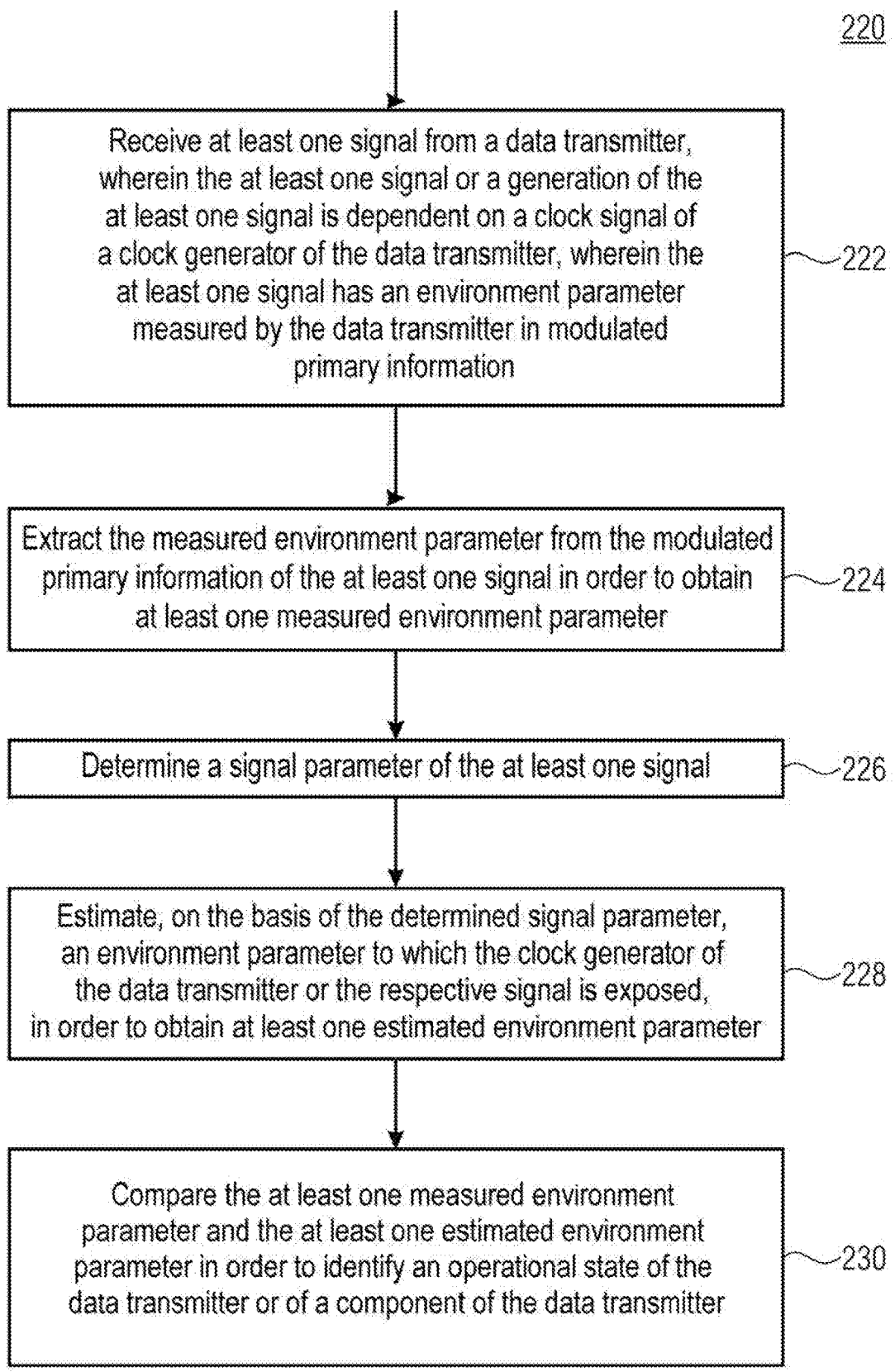
FIG. 14 shows a flow diagram of a method for determining an operational state of a data transmitter or of a component of the data transmitter, according to a further exemplary embodiment of the present invention.

FIG. 14 shows a flow diagram of a method 220 for determining an operational state of a data transmitter or of a component of the data transmitter, according to a further exemplary embodiment of the present invention. The method 220 comprises a step 222 of receiving at least one signal from a data transmitter, wherein the at least one signal or a generation of the at least one signal is dependent on a clock signal of a clock generator of the data transmitter, wherein the at least one signal has an environment parameter measured by the data transmitter in modulated primary information. The method 220 further comprises a step 224 of extracting the measured environment parameter from the modulated primary information of the at least one signal in order to obtain at least one measured environment parameter. The method further 220 comprises a step 226 of determining a signal parameter of the at least one signal. The method 220 further comprises a step 228 of estimating, on the basis of the determined signal parameter, an environment parameter to which the clock generator of the data transmitter or the respective signal is exposed, in order to obtain at least one estimated environment parameter. The method 220 further comprises a step 230 of comparing the at least one measured environment parameter and the at least one estimated environment parameter in order to identify an operational state of the data transmitter or of a component of the data transmitter.

Although some aspects have been described in connection with a device, these aspects obviously also represent a description of the corresponding method, so that a block or a component of a device should also be understood as a corresponding method step or as a feature of a method step. Similarly, aspects that have been described in connection with or as a method step also represent a description of a corresponding block or detail or feature of a corresponding device. Some or all of the method steps can be carried out by a hardware device (or using a hardware device) such as, for example, a microprocessor, a programmable computer or an electronic circuit. In some exemplary embodiments, some or a plurality of the most important method steps can be carried out by a device of this type.

Depending on specific implementation requirements, exemplary embodiments of the invention can be implemented in hardware or in software. The implementation can be carried out using a digital storage medium, for example a floppy disk, a DVD, a Blu-ray disc, a CD, a ROM, a PROM, an EPROM, an EEPROM or a FLASH memory, a hard disk or a different magnetic or optical storage device on which electronically readable control signals are stored which can interact or interact with a programmable computer system in such a way that the respective method is carried out. The digital storage medium can therefore be computer-readable.

Some exemplary embodiments according to the invention therefore comprise a data medium which has electronically readable control signals which are capable of interworking with a programmable computer system in such a way that one of the methods described herein is carried out.

Exemplary embodiments of the present invention can generally be implemented as a computer program product with a program code, wherein the program code is effective in carrying out one of the methods when the computer program product runs on a computer.

The program code can also be stored, for example, on a machine-readable medium.

Other exemplary embodiments comprise the computer program for carrying out one of the methods described herein, wherein the computer program is stored on a machine-readable medium.

In other words, one exemplary embodiment of the method according to the invention is therefore a computer program which has a program code to carry out one of the methods described herein when the computer program runs on a computer.

A further exemplary embodiment of the method according to the invention is therefore a data medium (or digital storage medium or a computer-readable medium) on which the computer program to carry out one of the methods described herein is recorded. The data medium, the digital storage medium or the computer-readable medium are typically tangible and/or non-ephemeral or non-transient.

A further exemplary embodiment of the method according to the invention is therefore a data stream or a sequence of signals which represent(s) the computer program to carry out one of the methods described herein. The data stream or the sequence of signals may, for example, be configured in such a way as to be transferred via a data communication connection, for example via the Internet.

A further exemplary embodiment comprises a processing device, for example a computer or a programmable logic component which can be configured or adapted in such a way as to carry out one of the methods described herein.

A further exemplary embodiment comprises a computer on which the computer program to carry out one of the methods described herein is installed.

A further exemplary embodiment according to the invention comprises a device or system which is designed to transmit a computer program to carry out at least one of the methods described herein to a receiver. The transmission can take place, for example, electronically or optically. The receiver may, for example, be a computer, a mobile device, a storage device or a similar device. The device or the system can comprise, for example, a file server to transmit the computer program to the receiver.

In some exemplary embodiments, a programmable logic component (for example a field-programmable gate array, an FPGA) can be used to perform some or all functionalities of the methods described herein. In some exemplary embodiments, a field-programmable gate array can interwork with a microprocessor to carry out one of the methods described herein. In some exemplary embodiments, the methods are generally carried out by any given hardware device. This may be universally usable hardware such as a computer processor (CPU) or hardware specific to the method, such as, for example, an ASIC.

The devices described herein can be implemented, for example, using a hardware device, or using a computer, or using a combination of a hardware device and a computer.

The devices described herein, or any components of the devices described herein, can be implemented at least partially in hardware and/or in software (computer program).

The methods described herein can be implemented, for example, using a hardware device, or using a computer, or using a combination of a hardware device and a computer.

The methods described herein, or any components of the methods described herein can be carried out at least partially by hardware and/or by software.

The exemplary embodiments described above merely represent an illustration of the principles of the present invention. Modifications and variations of the arrangements and details described herein will obviously be evident to other persons skilled in the art. The invention is therefore intended to be limited only by the scope of protection of the patent claims set out below, and not by the specific details that have been presented by way of the description and the explanation of the exemplary embodiments herein.

The following is a list of literature references mentioned in the written specification above:

[1] https://en.wikipedia.org/wiki/Crystal_oscillator (last accessed Apr. 6, 2020)
https://de.wikipedia.org/wiki/Schwingquarz (last accessed Apr. 6, 2020)
[2] https://www.nxp.com/docs/en/application-note/AN3251.pdf (last accessed Apr. 6, 2020)
[3] https://de.wikipedia.org/wiki/Quadraturphasenumtastung#/media/File:QPSK_Gray_Coded.svg (last accessed Apr. 6, 2020)
[4] http://eur-lex.europa.eu/legal-content/DE/TXT/PDF/?uri=uriserv:OJ.L_.2016.119.01.0001.01.DEU
[5] https://www.sii.co.jp/en/quartz/circuit-design/ (last accessed Apr. 6, 2020)
[6] https://en.wikipedia.org/wiki/Normal_distribution (last accessed Apr. 6, 2020)
https://de.wikipedia.org/wiki/Normalverteilung (last accessed Apr. 6, 2020)
[7] ETSI TS 103 357 Specification

The invention claimed is:

1. A data receiver, comprising:
an input configured to receive at least one signal from a data transmitter and to obtain at least one environment parameter of the data transmitter or of an ambient environment of the data transmitter;
the data receiver being configured to identify an operational state of the data transmitter or of a component of the data transmitter on a basis of a comparison between:
the at least one environment parameter or an environment parameter profile determined on a basis of the at least one environment parameter received from the data transmitter; and
an environment parameter reference profile which describes an expected environment parameter or an expected environment parameter profile in the ambient environment of the data transmitter;
the at least one signal containing modulated primary information; and
the data receiver being configured to extract a signal parameter from the modulated primary information to obtain the at least one environment parameter as information additional to the modulated primary information;

the modulated primary information representing at least one of an ID of the data transmitter, a synchronization sequence, payload data or dummy data; and the signal parameter being selected from at least one parameter selected from the group consisting of:
a receive carrier frequency,
a receive time,
a receive symbol rate,
a receive modulation index,
a Doppler frequency,
a signal-to-noise ratio,
a signal power,
a channel phase,
a channel attenuation,
a channel dispersion,
a polarization rotation, and
a change therein.

2. The data receiver according to claim 1, wherein the environment parameter profile is further based on at least one previously obtained environment parameter.

3. The data receiver according to claim 1, wherein:
the at least one signal or a generation of the at least one signal is dependent on a clock signal of a clock generator of the data transmitter; and
the data receiver is configured to determine a signal parameter of the respective signal and to determine, on a basis of the signal parameter, the respective environment parameter to which a clock generator of the data transmitter or the respective signal is exposed.

4. The data receiver according to claim 3, wherein:
the data receiver is configured to combine the at least one environment parameter extracted from the modulated primary information and the at least one environment parameter determined on the basis of the signal parameter in order to obtain at least one combined environment parameter; and
the data receiver is configured to identify an operational state of the data transmitter or of a component of the data transmitter on a basis of a comparison between:
the at least one combined environment parameter or an environment parameter profile determined on a basis of the at least one combined environment parameter; and
the environment parameter reference profile which describes the expected environment parameter or the expected environment parameter profile in the environment of the data transmitter.

5. The data receiver according to claim 1, wherein the environment parameter reference profile is determined in advance.

6. The data receiver according to claim 1, wherein the data receiver is configured to adjust the environment parameter reference profile on a basis of previously obtained environment parameters.

7. The data receiver according to claim 1, wherein the data receiver is configured to generate the environment parameter reference profile on a basis of obtained environment parameters of a different data transmitter or a group of different data transmitters.

8. The data receiver according to claim 1, wherein the data receiver is configured to identify a defective operational state of the data transmitter or of a component of the data transmitter on the basis of the comparison.

9. The data receiver according to claim 1, wherein the data receiver is configured to estimate a service life of a component of the data transmitter on the basis of the comparison.

10. The data receiver according to claim 1, wherein:
the data receiver is further configured to determine at least one signal parameter of the at least one signal;
the data receiver is configured to identify an operational state of the data transmitter or of a component of the data transmitter on a basis of a comparison between:
the at least one determined signal parameter or a signal parameter profile determined on the basis of the at least one determined signal parameter; and
a signal parameter reference profile which describes an expected signal parameter or an expected signal parameter profile.

11. The data receiver according to claim 1, wherein the determined signal parameter profile is further based on at least one previously determined signal parameter.

12. The data receiver according to claim 1, wherein:
the at least one signal or a generation of the at least one signal is dependent on a clock signal of a clock generator of the data transmitter;
the data receiver is configured to determine a signal parameter multiple times via the respective signal in order to determine a profile of the signal parameter, and to determine, on the basis of the determined profile of the signal parameter, the environment parameter profile to which the clock generator of the data transmitter or the respective signal is exposed; and
the data receiver is configured to identify an operational state of the data transmitter or of a component of the data transmitter on a basis of a comparison between:
the environment parameter profile; and
the environment parameter reference profile which describes an expected environment parameter profile during the transmission of the respective signal.

13. The data receiver according to claim 1, wherein the environment parameter reference profile takes into account delays in an impact of environment parameter changes on a clock generator.

14. The data receiver according to claim 1, wherein the data receiver is configured to determine a signal parameter of the respective signal and to determine a component installed on the data transmitter on a basis of the signal parameter thus determined or a change in the signal parameter.

15. The data receiver according to claim 1, wherein:
the at least one signal contains information relating to the component installed in the data transmitter in modulated primary information; and
the data receiver is configured to carry out a cross-check with the installed component determined via the signal parameter or a change in the signal parameter on a basis of the information relating to the installed component.

16. The data receiver according to claim 14, wherein the data receiver is configured to identify a manipulation or incorrect installation of the data transmitter on a basis of the determined installed component.

17. The data receiver according to claim 1, wherein the environment parameter is at least one parameter selected from the group consisting of:
a temperature,
a relative humidity,
an atmospheric pressure,
an electromagnetic radiation,
a brightness,
a movement,
a vibration, and
a change therein.

18. The data receiver according to claim 1, wherein the data receiver is a data receiver of a wireless communication system.

19. The data receiver according to claim 1, wherein the data receiver is a base station.

20. The data receiver according to claim 1, wherein the data transmitter is a sensor node.

21. A data receiver, comprising:
an input configured to receive at least one signal from a data transmitter, wherein the at least one signal in each case containing an environment parameter measured by the data transmitter in modulated primary information;
the data receiver being configured to extract a respective measured environment parameter from the respective modulated primary information in order to obtain at least one measured environment parameter; and
the at least one signal or a generation of the at least one signal being dependent on a clock signal of a clock generator of the data transmitter;
the data receiver being configured in each case to determine a signal parameter of the at least one signal and to estimate, on a basis of the respective signal parameter, a respective environment parameter to which the clock generator of the data transmitter is exposed, and to thereby obtain at least one estimated environment parameter, as information additional to the modulated primary information;
wherein the data receiver is configured to identify an operational state of the data transmitter or of a component of the data transmitter on a basis of a comparison between the at least one measured environment parameter and the at least one estimated environment parameter.

22. A method, comprising the following steps:
receiving at least one signal from a data transmitter in order to obtain at least one environment parameter of the data transmitter or of an environment of the data transmitter
determining an operational state of the data transmitter or of a component of the data transmitter on a basis of a comparison between:
the at least one environment parameter or an environment parameter profile determined on a basis of the at least one environment parameter; and
an environment parameter reference profile which describes an expected environment parameter or an expected environment parameter profile in the environment of the data transmitter;
the at least one signal containing modulated primary information; and
the data receiver being configured to extract a respective signal parameter from the modulated primary information to obtain the at least one environment parameter as information additional to the modulated primary information;
the modulated primary information representing at least one of an ID of the data transmitter, a synchronization sequence, payload data or dummy data; and
the signal parameter being selected from at least one parameter selected from the group consisting of:
a receive carrier frequency,
a receive time,
a receive symbol rate,
a receive modulation index,
a Doppler frequency,
a signal-to-noise ratio,
a signal power,
a channel phase,
a channel attenuation,
a channel dispersion,
a polarization rotation, and
a change therein.

23. The method according to claim 22, wherein the step of receiving the at least one signal is carried out by a base station of a communication system.

24. The method according to claim 23, wherein the step of determining the deviation of the data transmitter from a reference operational state is carried out by a data receiver or by a server of the communication system.

25. A method, comprising the following steps:
receiving at least one signal from a data transmitter, the at least one signal or a generation of the at least one signal being dependent on a clock signal of a clock generator of the data transmitter, and the at least one signal containing an environment parameter measured by the data transmitter in modulated primary information;
extracting the environment parameter from the modulated primary information of the at least one signal in order to obtain at least one measured environment parameter;
determining a signal parameter of the at least one signal;
estimating, on a basis of the determined signal parameter, an environment parameter to which the clock generator of the data transmitter is exposed, to thereby obtain at least one estimated environment parameter as information additional to the modulated primary information; and
comparing the at least one measured environment parameter and the at least one estimated environment parameter in order to identify an operational state of the data transmitter or of a component of the data transmitter.

26. A server, comprising:
hardware and software configured to obtain at least one signal and at least one environment parameter of a data transmitter or of an environment of the data transmitter;
the server being configured to identify an operational state of the data transmitter or of a component of the data transmitter on a basis of a comparison between:
the at least one environment parameter obtained from the data transmitter or an environment parameter profile determined on a basis of the at least one environment parameter; and
an environment parameter reference profile that describes an expected environment parameter in the environment of the data transmitter;
the at least one signal containing modulated primary information; and
the data receiver being configured to extract a signal parameter from the modulated primary information to obtain the at least one environment parameter as information additional to the modulated primary information;
the modulated primary information representing at least one of an ID of the data transmitter, a synchronization sequence, payload data or dummy data; and
the signal parameter being selected from at least one parameter selected from the group consisting of:
a receive carrier frequency,
a receive time,
a receive symbol rate,
a receive modulation index,
a Doppler frequency,
a signal-to-noise ratio,
a signal power,
a channel phase, a channel attenuation,
a channel dispersion,
a polarization rotation, and
a change therein.

* * * * *